United States Patent
Kirmani et al.

(10) Patent No.: US 10,991,123 B2
(45) Date of Patent: *Apr. 27, 2021

(54) THREE-DIMENSIONAL OBJECT LOCALIZATION USING A LOOKUP TABLE

(71) Applicant: GOOGLE LLC, Mountain View, CA (US)

(72) Inventors: Ghulam Ahmed Kirmani, Mountain View, CA (US); Andrea Colaco, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,647

(22) Filed: Aug. 12, 2019

(65) Prior Publication Data

US 2020/0034986 A1  Jan. 30, 2020

Related U.S. Application Data

(63) Continuation of application No. 15/476,841, filed on Mar. 31, 2017, now Pat. No. 10,380,760.

(51) Int. Cl.
| | |
|---|---|
| *G06K 9/00* | (2006.01) |
| *G08B 13/184* | (2006.01) |
| *G06T 7/73* | (2017.01) |
| *G06F 3/01* | (2006.01) |
| *G06F 3/042* | (2006.01) |
| *G06T 7/11* | (2017.01) |
| *G06T 7/20* | (2017.01) |

(52) U.S. Cl.
CPC ............... *G06T 7/74* (2017.01); *G06F 3/017* (2013.01); *G06F 3/0425* (2013.01); *G06K 9/00355* (2013.01); *G06T 7/11* (2017.01); *G06T 7/20* (2013.01); *G08B 13/184* (2013.01); *G06F 2203/04101* (2013.01); *G06T 2207/10016* (2013.01); *G06T 2207/10028* (2013.01); *G06T 2207/20076* (2013.01); *G06T 2207/30244* (2013.01)

(58) Field of Classification Search
None
See application file for complete search history.

(56) References Cited

U.S. PATENT DOCUMENTS

2013/0211238 A1* 8/2013 DeCharms ........... A61B 5/4824
600/418

* cited by examiner

*Primary Examiner* — Idowu O Osifade
(74) *Attorney, Agent, or Firm* — Brake Hughes Bellermann LLP

(57) ABSTRACT

A process executes at an electronic system. The process identifies device characteristics of an imaging device that includes signal emitters and signal detectors. The process illuminates a field of view by signals from the signal emitters according to a modulation signal generated by the imaging device. At each of the signal detectors, the process obtains a response signal, and samples the response signals to form a response vector. The process obtains a lookup table corresponding to the modulation signal and the device characteristics. The field of view is partitioned into a 3-dimensional plurality of voxels, and the lookup table specifies, for each voxel, expected signals received by the signal detectors when the voxel is filled and the signal emitters illuminate the field of view according to the modulation signal. The process compares the response vector to the lookup table to determine which voxels are filled.

20 Claims, 21 Drawing Sheets

Mesh the Field of View into Voxels $(r, \theta, \varphi)$ $(r, \theta, z)$

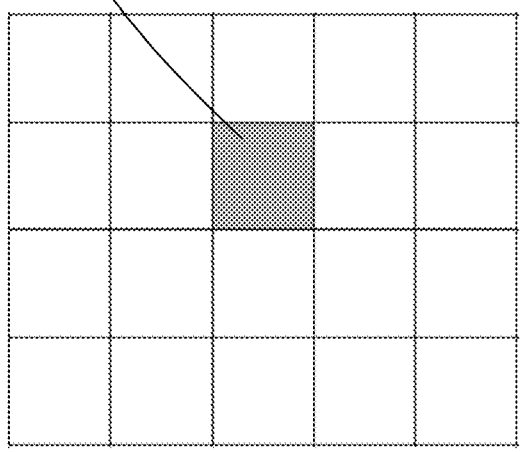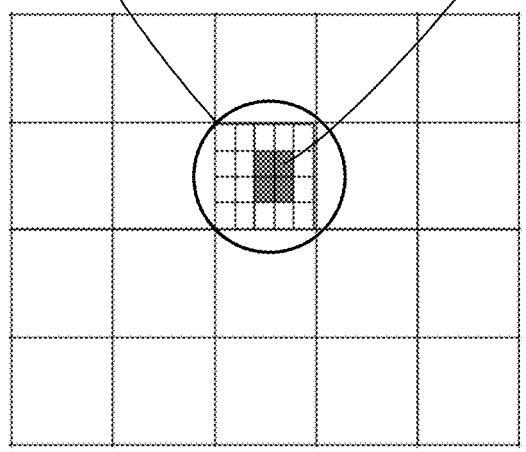

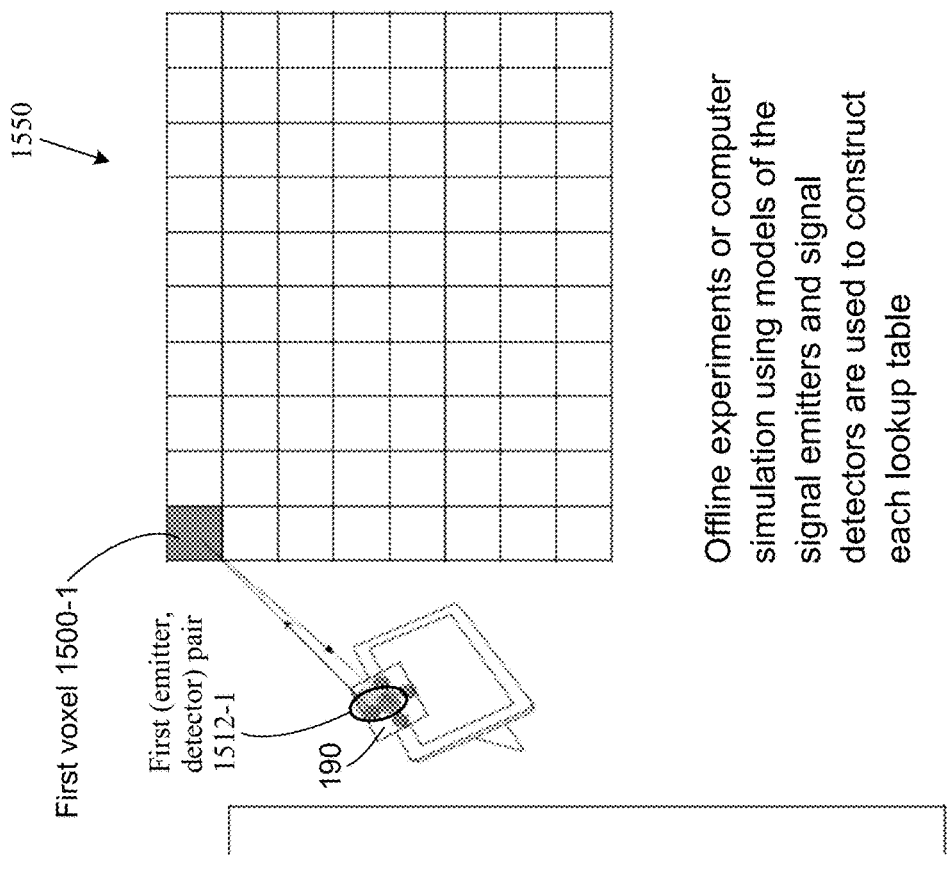
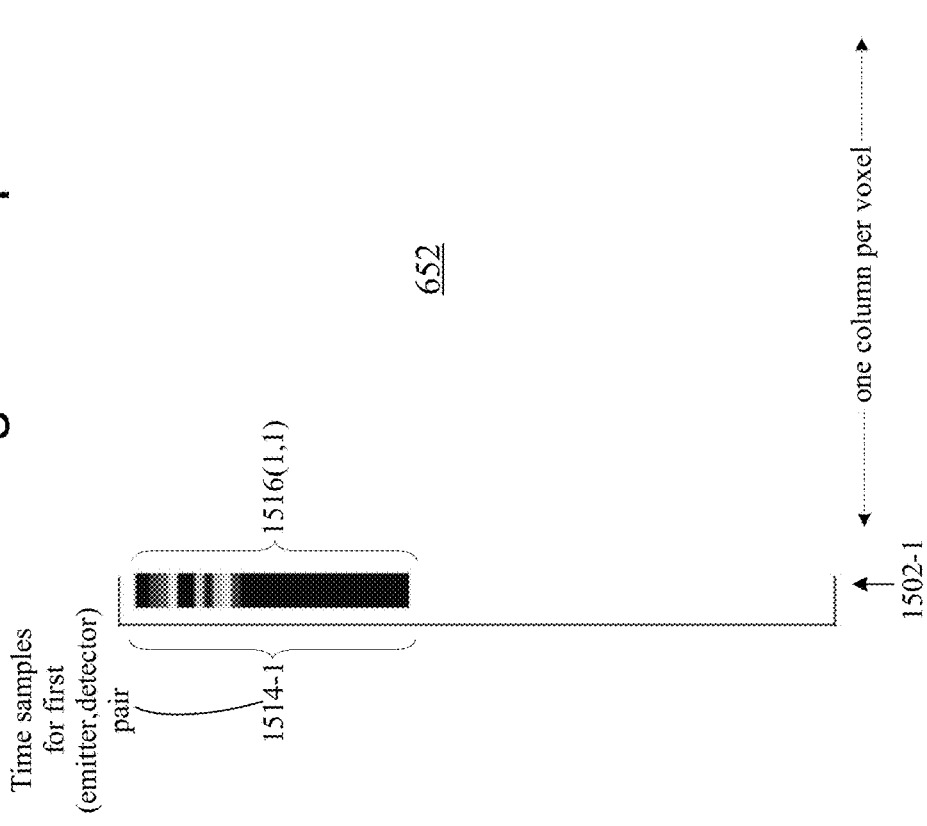
Figure 15

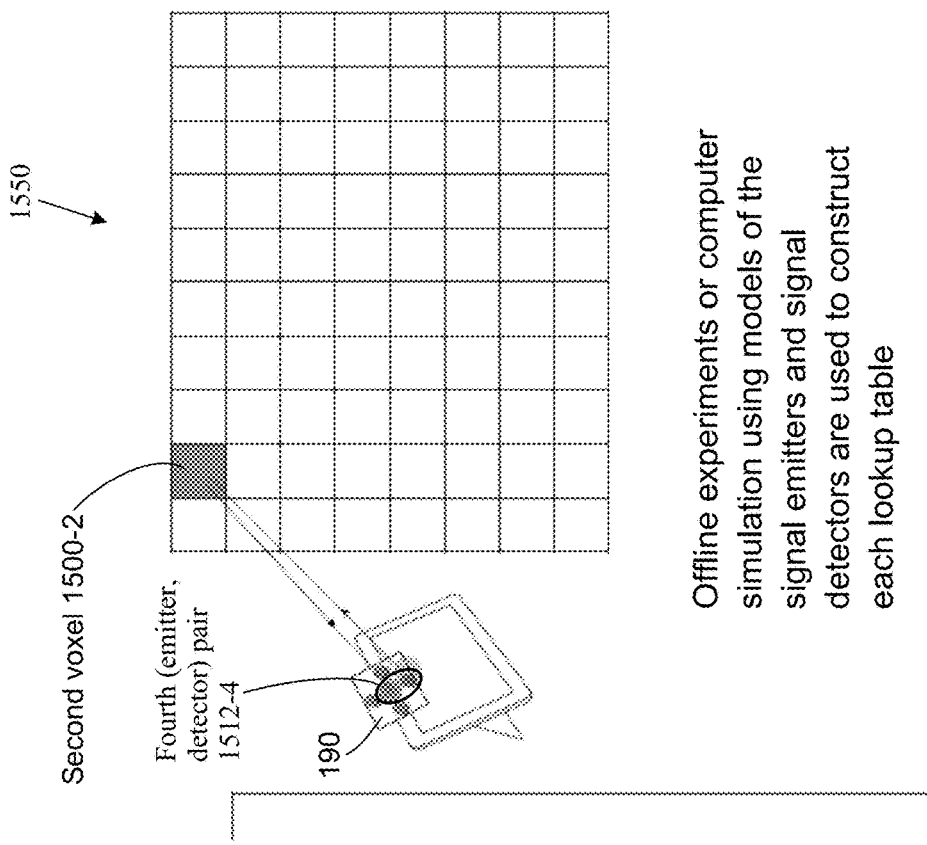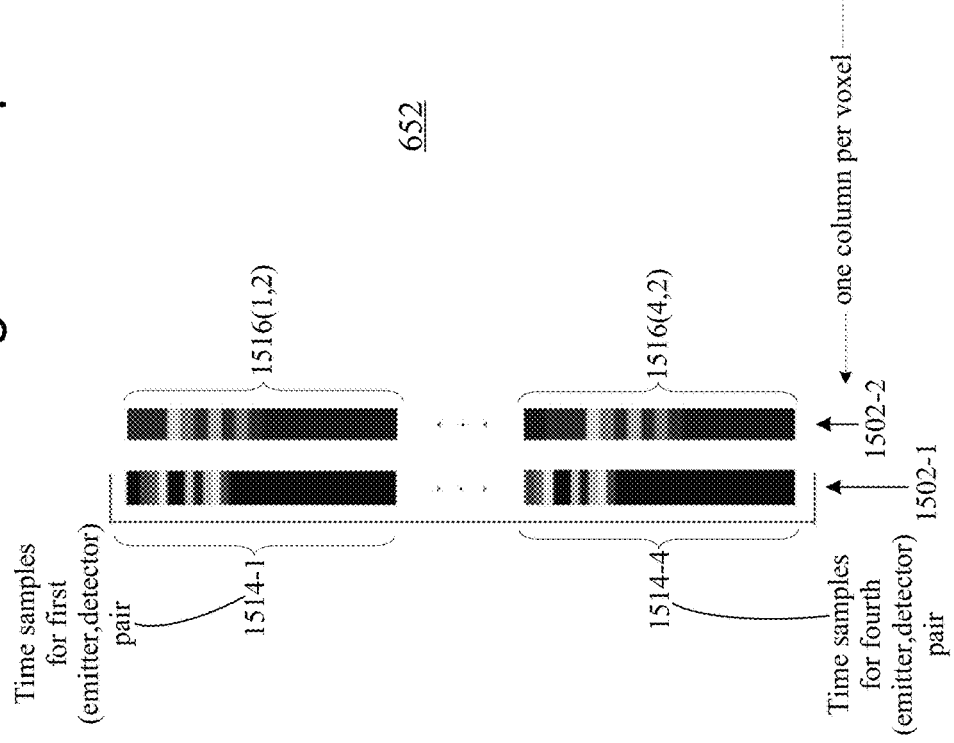
Figure 17

$$A = \begin{bmatrix} A_{1,1} & A_{1,2} & A_{1,3} & A_{1,4} & \cdots & \cdots & \cdots & A_{1,N-3} & A_{1,N-2} & A_{1,N-1} & A_{1,N} \\ A_{2,1} & A_{2,2} & A_{2,3} & A_{2,4} & \cdots & \cdots & \cdots & A_{2,N-3} & A_{2,N-2} & A_{2,N-1} & A_{2,N} \\ A_{3,1} & A_{3,2} & A_{3,3} & A_{3,4} & \cdots & \cdots & \cdots & A_{3,N-3} & A_{3,N-2} & A_{3,N-1} & A_{3,N} \\ A_{4,1} & A_{4,2} & A_{4,3} & A_{4,4} & \cdots & \cdots & \cdots & A_{4,N-3} & A_{4,N-2} & A_{4,N-1} & A_{4,N} \\ \vdots & \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots & \vdots \\ A_{M-3,1} & A_{M-3,2} & A_{M-3,3} & A_{M-3,4} & \cdots & \cdots & \cdots & A_{M-3,N-3} & A_{M-3,N-2} & A_{M-3,N-1} & A_{M-3,N} \\ A_{M-2,1} & A_{M-2,2} & A_{M-2,3} & A_{M-2,4} & \cdots & \cdots & \cdots & A_{M-2,N-3} & A_{M-2,N-2} & A_{M-2,N-1} & A_{M-2,N} \\ A_{M-1,1} & A_{M-1,2} & A_{M-1,3} & A_{M-1,4} & \cdots & \cdots & \cdots & A_{M-1,N-3} & A_{M-1,N-2} & A_{M-1,N-1} & A_{M-1,N} \\ A_{M,1} & A_{M,2} & A_{M,3} & A_{M,4} & \cdots & \cdots & \cdots & A_{M,N-3} & A_{M,N-2} & A_{M,N-1} & A_{M,N} \end{bmatrix}$$

652 → A

Columns 1–4: Emitter-Sensor Combination 1
⋯
Last four columns: Emitter-Sensor Combination 4

- 2002: measured time samples
- 652: lookup table
- 2004: voxels containing the object

Figure 21

$$Y = \begin{bmatrix} y_1 \\ y_2 \\ y_3 \\ y_4 \\ \cdots \\ \cdots \\ \cdots \\ \cdots \\ y_{M-3} \\ y_{M-2} \\ y_{M-1} \\ y_M \end{bmatrix} \begin{matrix} \left.\begin{matrix} \\ \\ \\ \\ \end{matrix}\right\} \text{Time Samples of Emitter-Sensor Combination 1} \\ \vdots \\ \left.\begin{matrix} \\ \\ \\ \\ \end{matrix}\right\} \text{Time Samples of Emitter-Sensor Combination n} \end{matrix}$$

$$X = \begin{bmatrix} x_1 \\ x_2 \\ x_3 \\ x_4 \\ \cdots \\ \cdots \\ \cdots \\ \cdots \\ x_{N-3} \\ x_{N-2} \\ x_{N-1} \\ x_N \end{bmatrix}$$

2004

$$\underset{X}{\arg\min} \; ( \underbrace{\|Y - AX\|_{\ell_2}}_{2310} + \underbrace{\lambda \|X\|_{\ell_1}}_{2320} )$$

2330

- measured time samples
- lookup table
- voxels containing the object

Figure 23

One-time simulation for each application specific configuration of emitters and detectors Real-time sensing and processing

THREE-DIMENSIONAL OBJECT LOCALIZATION USING A LOOKUP TABLE

RELATED APPLICATIONS

This application is a continuation of U.S. patent application Ser. No. 15/476,841, filed Mar. 31, 2017, which is hereby incorporated by reference in its entirety.

TECHNICAL FIELD

This application relates generally to data acquisition technology, and more particularly to determining object locations in a region of interest.

BACKGROUND

A smart home environment is created at a venue by integrating a plurality of smart devices, including intelligent, multi-sensing, network-connected devices, seamlessly with each other in a local area network and/or with a central server or a cloud-computing system to provide a variety of useful smart home functions. Sometimes, the smart home environment includes one or more network-connected cameras that are configured to provide video monitoring and security in the smart home environment. These cameras are often dedicated image capturing and processing devices that include two-dimensional image sensing arrays configured to provide detailed image information (e.g., object locations and motions, user gestures and depth mapping) related to a region of interest in the smart home environment. The detailed image information can also be uploaded to the central server and shared with the other smart devices in the smart home environment to control operations of the other smart devices (e.g., a specific hand gesture is detected from a video clip captured by a camera and used to unlock a smart door lock). However, in many circumstances, although the cameras can provide full resolution two-dimensional images and videos, they do not operate well when the ambient light level is low, and they are not available in many regions of interest in a smart home environment. It would be beneficial to have an accurate, low power, compact, and cost-efficient image capturing device that can work with smart devices installed at different regions of interest in a smart home environment.

SUMMARY

Accordingly, there is a need to create an accurate, low power, compact, and cost-efficient imaging solution that provides image information to other network-connected smart devices in a smart home environment. In some implementations, an imaging device uses time of flight (TOF) to identify the locations of objects. The imaging device includes one or more signal emitters and one or more signal detectors. The signal emitters illuminate a field of view using a modulation signal that has been modulated according to a train of signal pulses, and the signal detectors obtain from the field of view a response signal that reflects phase shifts of the modulation signal caused by objects in the field of view. The response signal is analyzed to identify which voxels in the field of view are filled. (A voxel is a 3-dimensional subdivision of the field of view, analogous to pixels, which represent a 2-dimensional subdivision of a flat surface.) Some implementations compute probability values, and each probability value indicates the probability that the corresponding voxel in the field of view is filled by an object. In some implementations, the imaging device uses the voxel information to derive three-dimensional (3D) imaging information (e.g., object locations and movements, user gestures, and depth mapping) related to the field of view. In some implementations where the imaging device is integrated with other smart devices, the 3D imaging information is used to control the operation of the other smart devices. For example, because of their compact form factor, the signal emitters and detectors of the imaging device can be conveniently disposed within a smoke detector without requiring a makeover of the smoke detector. In some implementations, user gestures are identified from the 3D imaging information obtained by the integrated imaging device for controlling the smoke detector or another smart device.

In accordance with some implementations, a method for analyzing a field of view is performed at an electronic system having one or more processors and memory storing one or more programs configured for execution by the one or more processors. The process identifies a plurality of device characteristics of an imaging device that includes one or more signal emitters and one or more signal detectors. The process illuminates the field of view by signals from the one or more signal emitters according to a modulation signal generated by the imaging device. At each of the signal detectors, the process obtains a response signal from the field of view and samples the response signals to form a response vector. The process obtains a lookup table corresponding to the modulation signal and the device characteristics. The field of view is partitioned into a 3-dimensional plurality of voxels and the lookup table includes information that specifies, for each voxel, expected signals received by the signal detectors when the voxel is filled and the signal emitters illuminate the field of view according to the modulation signal. The process then compares the response vector to the lookup table to determine which voxels are filled. In some implementations, comparing the response vector to the lookup table includes computing a probability vector with a plurality of components, where each component of the probability vector specifies a probability value that a corresponding voxel is filled.

According to some implementations, the process identifies an object that occupies a region of interest in the field of view based on the plurality of probability values in the probability vector. The region of interest includes a subset of the plurality of voxels whose corresponding probability values are greater than a predetermined threshold value.

According to some implementations, the process identifies an object that occupies a region of interest in the field of view in accordance with the plurality of probability values in the probability vector. The region of interest includes a first subset of the plurality of voxels whose corresponding probability values are substantially greater than probability values corresponding to a second subset of voxels surrounding the first subset of voxels. In some implementations, "substantially greater" means the first subset of probability values are greater than 75% whereas the second subset of probability values are less than 50%. In some implementations, "substantially greater" means the first subset of probability values are at least 25% greater than the second subset of probability values.

According to some implementations, the process tracks movement of an object in the field of view during a sequence of two or more sampling times. In some implementations, this includes, at each sampling time, identifying the object at a distinct location associated with a distinct subset of the plurality of voxels. In some implementations, the tracked movement of the object includes a user gesture by a user located in the field of view. In some implementations, the process includes generating an alert command in accordance with the tracked movement of the object. In some implementations, the electronic system includes a smoke detector, the tracked movement is a hand wave towards the smoke detector, and the alert command toggles an alarm signal from the smoke detector (e.g., toggling off an alarm that is sounding).

According to some implementations, the modulation signal includes a pulse having a predetermined pulse width. According to some implementations, the modulation signal includes a digital signal corresponding to a bit stream containing a sequence of zeros and ones. According to some implementations, the modulation signal includes a digital clock signal having a variable frequency. According to some implementations, the modulation signal includes a chirp signal whose frequency increases or decreases with time within a frequency range.

According to some implementations, the process generates a two-dimensional depth map according to the determined filled voxels. In accordance with some implementations, each probability value in the probability vector corresponds to an index value that identifies a location of a corresponding voxel. In accordance with some implementations, the process evaluates predetermined depth criteria. When the probability values of the probability vector meet the predetermined depth criteria, the process calculates one or more depth values of the 2D depth map based on the index values of a first plurality of voxels.

In accordance with some implementations, each column of the lookup table includes samples of unit response signals arranged in a series. Each unit response signal is sensed by a subset of the one or more signal detectors. For each unit response signal, a subset of the one or more signal emitters are synchronized to illuminate the field of view according to a corresponding illumination pattern, thereby producing the unit response signal sensed at the subset of the one or more signal detectors.

In accordance with some implementations, the field of view is partitioned into the plurality of voxels based on a Cartesian coordinate system, a spherical coordinate system, or a cylindrical coordinate system.

In accordance with some implementations, the device characteristics include characteristics of the one or more signal emitters, characteristics of the one or more signal detectors, and characteristics of one or more lenses and diffusers that modulate illumination by the one or more signal emitters.

In accordance with some implementations, the process calibrates a baseline of the response vector to remove background noise existing in the response signal prior to comparing the response vector to the lookup table.

Some implementations subdivide the field of view into a coarse set of (large) voxels, then subdivide each of the coarse voxels into fine voxels. When identifying an object, the process first identifies the general location of an object using the coarse voxels, then determines a more precise location based on the fine voxels. In some implementations, each voxel identified above is a coarse voxel that is further partitioned into a plurality of fine voxels. The process obtains a fine lookup table corresponding to the modulation signal and the device characteristics. The fine lookup table includes information that specifies, for each fine voxel, expected signals received by the signal detectors when the fine voxel is filled and the signal emitters illuminate the field of view according to the modulation signal. The process compares the response vector to the fine lookup table to compute a fine probability vector including a plurality of fine probability values. Each fine probability value specifies a probability that a corresponding fine voxel is filled.

In accordance with some implementations, comparing the response vector to the lookup table includes determining a voxel vector X that minimizes $\|Y-AX\|_2$. Y is the response vector, A is the lookup table, and X is a vector whose component values are zero or one depending on whether a corresponding voxel is filled.

In accordance with some implementations, an electronic system is configured for analyzing a field of view. The electronic system includes one or more processors and memory. The memory stores one or more programs for execution by the one or more processors. The one or more programs include instructions for performing any of the methods described herein.

In accordance with some implementations, a non-transitory computer readable storage medium stores one or more programs configured for execution by one or more processors of an electronic system. The one or more programs include instructions for performing any of the methods described herein.

In accordance with some implementations, a process creates a lookup table for analyzing a field of view. The process executes at an electronic system having one or more processors and memory. The memory stores one or more programs configured for execution by the one or more processors. The process identifies a plurality of device characteristics of an imaging device that includes one or more signal emitters and one or more signal detectors. The process determines a modulation signal for controlling the one or more signal emitters of the imaging device to illuminate the field of view. The process partitions the field of view into a 3-dimensional plurality of voxels. The process generates a plurality of unit response signals in accordance with the determined modulation signal and the device characteristics. Each unit response signal is associated with one of the plurality of voxels in the field of view, and each unit response signal represents reflection from the voxel when the voxel is filled and reflects illumination generated by one of the one or more signal emitters according to the modulation signal. The process samples the plurality of unit response signals to form a plurality of unit response vectors. Each unit response vector corresponds to one of the plurality of voxels. The process then combines the plurality of unit response vectors to form the lookup table.

In some implementations, each column of the lookup table corresponds to a distinct voxel in the field of view, and each column includes one or more unit response vectors corresponding to the voxel.

In some implementations, each row of the lookup table corresponds to a distinct voxel in the field of view and each row includes one or more unit response vectors corresponding to the voxel.

In some implementations, the lookup table is formed by computer simulation before the imaging device is shipped to a customer.

In some implementations, forming the lookup table includes performing a plurality of calibration experiments at a replica of the imaging device prior to shipping the imaging device to a customer. In some implementations, each calibration experiment includes: filling one of the voxels in the field of view; activating the signal emitters at the replica of the imaging device to illuminate the field of view according to the determined modulation signal; measuring unit response signals at the signal detectors of the replica of the imaging device; and storing a sampling of the measured unit response signals in the lookup table.

In some implementations, each voxel is a coarse voxel that is further partitioned into a plurality of fine voxels. The process generates a second plurality of unit response signals in accordance with the determined modulation signal and the device characteristics. Each of the second plurality of unit response signals is associated with one of the plurality of fine voxels in the field of view. Each of the second plurality of unit response signals represents reflection from the fine voxel when the fine voxel is filled and reflects illumination generated by the one or more signal emitters according to the modulation signal. The process samples the second plurality of unit response signals to form a second plurality of unit response vectors. Each of the second plurality of unit response vectors corresponds to one of the plurality of fine voxels. The process combines the second plurality of unit response vectors to form a second lookup table.

In some implementations, the one or more signal emitters generate one of radio waves, microwaves, infrared radiation, visible light, ultraviolet radiation, and ultrasonic waves.

In some implementations, the one or more signal emitters include a light emitting diode (LED).

In some implementations, the one or more signal detectors include a photodiode.

In some implementations, the field of view is partitioned into the plurality of voxels based on a Cartesian coordinate system, a spherical coordinate system, or a cylindrical coordinate system.

In some implementations, the plurality of device characteristics include characteristics of the one or more signal emitters, characteristics of the one or more signal detectors, and characteristics of one or more lenses and diffusers that modulate illumination by the one or more signal emitters.

In some implementations, the process samples response signals received by the imaging device to form a response vector. The process compares the response vector to the lookup table to compute a probability vector including a plurality of probability values, where each probability value specifies a probability that a corresponding voxel is filled.

In some implementations, the modulation signal includes a pulse having a predetermined pulse width.

In some implementations, the modulation signal includes a digital signal corresponding to a bit stream containing a sequence of zeros and ones.

In some implementations, the modulation signal includes a digital clock signal having a variable frequency.

In some implementations, the modulation signal includes a chirp signal whose frequency increases or decreases with time within a frequency range.

In some implementations, the process arranges samples of unit response signals in series in each column. Each unit response signal is sensed by a subset of the one or more signal detectors. For each unit response signal, a subset of the one or more signal emitters are synchronized to illuminate the field of view according to a corresponding illumination pattern, thereby producing the unit response signal sensed at the subset of the one or more signal detectors.

In accordance with some implementations, an electronic system is configured for analyzing a field of view. The electronic system includes one or more processors and memory. The memory stores one or more programs for execution by the one or more processors. The one or more programs include instructions for performing any of the methods described herein.

In accordance with some implementations, a non-transitory computer readable storage medium stores one or more programs configured for execution by one or more processors of an electronic system. The one or more programs include instructions for performing any of the methods described herein.

In some implementations, the electronic system includes the imaging device, a smart home device, and/or a remote server.

In accordance with some implementations, each probability value in the probability vector corresponds to an index value that identifies a location of a corresponding voxel. When the process determines that the probability values of the probability vector meet predetermined depth criterion, the process calculates one or more depth values for a two-dimensional depth map based on the index values of the first plurality of voxels. In some implementations, each pixel of the two-dimensional depth map is associated with a subset of probability values in the probability vector. In accordance with the predetermined depth criterion, an index corresponding to the largest probability value among the subset of probability values is applied to determine the depth on the two dimensional depth map. In some implementations, the two-dimensional depth map is used to generate an environment map.

In some implementations, the signal emitters are arranged according to a spatial pattern.

In some implementations, each column of the lookup table and the response vector are separately normalized prior to the comparison.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 13A and 13B illustrate a hierarchical process for identifying filled voxels in accordance with some implementations.

FIGS. 15-19 illustrate a process of building a lookup table used for determining the three-dimensional locations of objects in a field of view, in accordance with some implementations.

FIGS. 20-23 illustrate a process for identifying objects in the field of view of an imaging device using a lookup table in accordance with some implementations.

Like reference numerals refer to corresponding parts throughout the several views of the drawings.

DESCRIPTION OF IMPLEMENTATIONS

Figure 1:
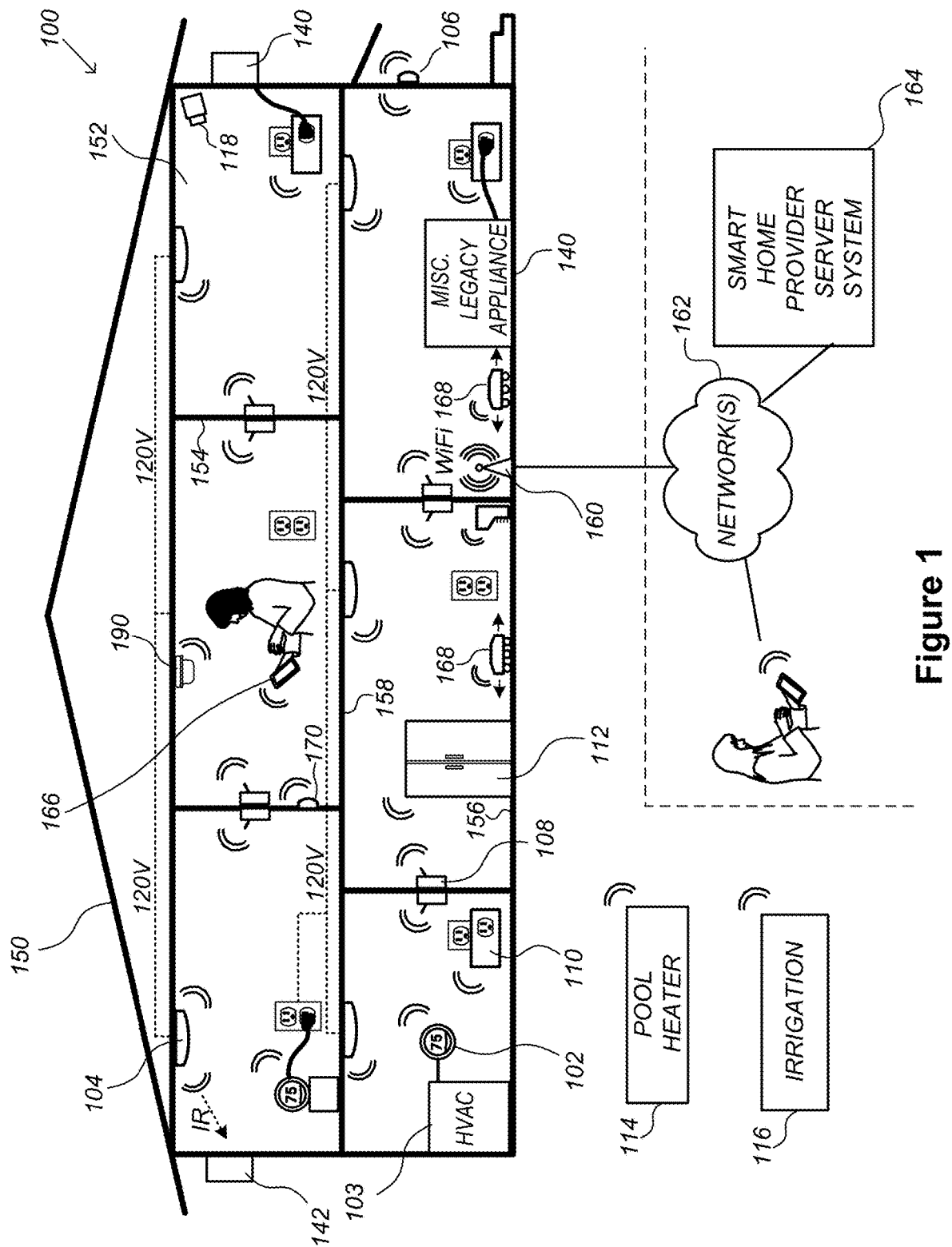
FIG. 1 is a representative smart home environment in accordance with some implementations.

Various implementations of compact imaging devices use time of flight (TOF) to identify object locations. This includes standalone image capturing devices for video monitoring and integrated imaging devices that provide image information to other network-connected smart devices in a smart home environment. An imaging device includes one or more signal emitters and one or more signal detectors, and does not require a full 2D image sensor array as found in most video cameras. The signal emitters illuminate a field of view using a modulation signal that has been modulated according to a train of signal pulses, and the signal detectors obtain from the field of view a response signal corresponding to the modulation signal. The response signal reflects phase shifts of the modulation signal caused by objects located in the field of view. The response signal is analyzed to determine which voxels in the field of view are filled. This enables determining object locations in the field of view. In some implementations, the imaging device uses voxel information to derive three-dimensional (3D) imaging information (e.g., object locations and movements, user gestures, and depth mapping) in the field of view. Further, in some implementations, when the imaging device is integrated into (or connected to) another smart device, the 3D imaging information is used to control operation of the smart device.

The imaging devices and methods described herein determine voxel information associated with a field of view based on one or more lookup tables. The lookup tables are created by computer simulation or calibration experiments before the imaging device is shipped to a customer. To compute the lookup tables, the field of view is partitioned into a three-dimensional plurality of voxels. When the signal emitters illuminate the field of view according to the modulation signal, unit response signals are generated for individual voxels in the field of view (e.g., based on an individual voxel being filled). The unit response signals are sampled at the signal detectors to give corresponding unit response vectors. These unit response vectors for the voxels in the field of view are combined to form the lookup tables for the field of view. While analyzing a field of view, the signal emitters of the imaging device illuminate the field of view using a predetermined modulation signal, and the signal detectors collect response signals from the field of view. The response signals are sampled to form a response vector, which is compared to the lookup tables to determine filled voxels. Some implementations compute a probability vector, where each probability value identifies a likelihood that a respective voxel in the field of view is occupied by an object. This probability information is then used to determine object locations and movements, user gestures, depth mapping, and other 3D imaging information related to the field of view.

In some implementations, voxel information is obtained by applying two or more consecutive lookup tables (e.g., a coarse lookup table and a fine lookup table). For example, while analyzing the field of view, after a response signal is obtained in response to illumination of the field of view, the response signal is sampled to give a first response vector, and compared to a first lookup table to identify a region of interest in the field of view. Then, the response signal is sampled to give a second response vector, and compared to a second lookup table to determine which voxels in the region of interest are occupied. In some implementations, the second lookup table has a finer voxel size than the first lookup table, and the second lookup table is associated with the region of interest rather than the entire field of view.

In some implementations, the imaging device is a standalone device having its own image processing and storage capability. This allows the imaging device to analyze the field of view in which the imaging device is located and derive three-dimensional (3D) imaging information from the response signal related to the local field of view. In some implementations, the imaging device is integrated into (or connected to) another smart device that has computation and storage capabilities. The imaging device relies at least partially on the smart device to analyze the field of view and derive the 3D imaging information. In some implementations, the imaging device (standalone or integrated into a smart device) is coupled to a remote server via one or more communication networks. The imaging device may transfer the response signal that is received by its signal detectors or transfer a response signal that has been partially processed by a local processor. In this case, the imaging device at least partially relies on the remote server to analyze the field of view and derive the 3D imaging information.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIGS. 1-4 provide an overview of exemplary smart home device networks and capabilities.

FIG. 1 depicts a representative smart home environment in accordance with some implementations. The smart home environment 100 includes a structure 150, which may be a house, office building, garage, or mobile home. It will be appreciated that devices may also be integrated into a smart home environment 100 that does not include an entire structure 150, such as an apartment, condominium, or office space. Further, the smart home environment may control and/or be coupled to devices outside of the actual structure 150. Indeed, several devices in the smart home environment need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with, and/or supported by a wall 154, a floor 156, or a ceiling 158.

In some implementations, the smart home environment 100 includes a plurality of devices, including intelligent, multi-sensing, network-connected devices, that integrate seamlessly with each other in a smart home network 202 and/or with a central server or a cloud-computing system to provide a variety of useful smart home functions. The smart home environment 100 may include one or more intelligent, multi-sensing, network-connected thermostats 102 ("smart thermostats"), one or more intelligent, network-connected, multi-sensing hazard detection units 104 ("smart hazard detectors"), and one or more intelligent, multi-sensing, network-connected entryway interface devices 106 ("smart doorbells"). In some implementations, the smart thermostat 102 detects ambient climate characteristics (e.g., temperature and/or humidity) and controls an HVAC system 103 accordingly. The smart hazard detector 104 may detect the presence of a hazardous substance or a substance indicative of a hazardous substance (e.g., smoke, fire, and/or carbon monoxide). The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 ("smart wall switches"), along with one or more intelligent, multi-sensing, network-connected wall plug interfaces 110 ("smart wall plugs"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 includes a plurality of intelligent, multi-sensing, network-connected appliances 112 ("smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices may further allow a user to interact with the device even if the user is not proximate to the device. For example, a user may communicate with a device using a computer (e.g., a desktop computer, laptop computer, or tablet) or other portable electronic device (e.g., a smartphone) 166. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 100 using a network-connected computer or portable electronic device 166. In some examples, some or all of the occupants (e.g., individuals who live in the home) may register their devices 166 with the smart home environment 100. Such registration may be made at a central server to authenticate the occupant and/or the device as being associated with the home and to give permission to the occupant to use the device to control the smart devices in the home. Occupants may use their registered devices 166 to remotely control the smart devices of the home, such as when an occupant is at work or on vacation. The occupant may also use a registered device to control the smart devices when the occupant is actually located inside the home, such as when the occupant is sitting on a couch inside the home. It should be appreciated that instead of or in addition to registering the devices 166, the smart home environment 100 may make inferences about which individuals live in the home and are therefore occupants, and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, and/or 118 ("the smart devices") are capable of data communications and information sharing with other smart devices, a central server or cloud-computing system, and/or other devices that are network-connected. The required data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any of a variety of custom or standard wired protocols (e.g., CAT6 Ethernet or HomePlug), or any other suitable communication protocol.

In some implementations, the smart devices serve as wireless or wired repeaters. For example, a first one of the smart devices communicates with a second one of the smart devices via a wireless router. The smart devices may further communicate with each other via a connection to one or more networks 162 such as the Internet. Through the one or more networks 162, the smart devices may communicate with a smart home provider server system 164 (also called a central server system and/or a cloud-computing system herein). In some implementations, the smart home provider server system 164 may include multiple server systems, each dedicated to data processing associated with a respective subset of the smart devices (e.g., a video server system may be dedicated to data processing associated with camera(s) 118). The smart home provider server system 164 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the smart home devices in the smart home environment 100 include one or more intelligent, multi-sensing, network-connected imaging devices 190 that use time of flight to identify object location, object motion, object proximity, user gestures, and environment depth. Each imaging device 190 includes one or more signal emitters and one or more signal detectors. To identify objects in the field of view based on time of flight, the imaging device 190 includes a limited number of signal emitters and signal detectors (e.g., 8 signal emitters and 2 signal detectors), and does not need a full 2D image sensor array as found in most video cameras. The one or more signal emitters are configured to illuminate the field of view with a signal that has been modulated, and the one or more signal detectors are configured to receive the response signal when the modulated signal is reflected from objects in the field of view. The response signal includes a phase shift with respect to the modulated signal, and the phase shift is associated with the length of time for the modulated signal to travel to and return from objects located within the field of view or a boundary of the field of view (e.g., a wall). In accordance with the phase shifts, the modulated signal and response signals are compared to determine a location of an object in the field of view. The modulated signal and response signals can be acoustic, ultrasonic, electromagnetic, visible light, ultraviolet light, infrared light, or other wave forms.

In some implementations, the imaging device 190 is a standalone dedicated device that includes signal emitters and signal detectors configured for illuminating the field of view and tracking response signals reflected from objects in the field of view. In some implementations, the imaging device 190 is integrated into (or connected to) a distinct electronic device (e.g., a smart device 204 such as one or more of the devices 102, 104, 106, 108, 110, 112, 114, 116, and/or 118). In some implementations, the imaging device is integrated into a voice-activated electronic device or a media device (e.g., a television) that is located in the smart home environment 100. The distinct electronic device includes signal emitters and signal detectors that are configured for illuminating the field of view and using response signals reflected from objects in the field of view to identify locations of objects using time of flight. In some implementations, the imaging device 190 is integrated into a camera 118, and one or more infrared light emitting diodes (IR LEDs) of the camera are activated to illuminate the field of view with infrared light. In this case, the imaging device 190 can identify objects in the field of view without interfering with image capture by the camera 118 using visible light. In some implementations, the imaging device 190 is integrated into a smart hazard detector 104 (e.g., smoke detector), and configured to capture a response signal that can be analyzed to identify user gestures. The identified user gestures can control the smart hazard detector 104 or other smart devices 204 in the home environment 100.

Figure 2:
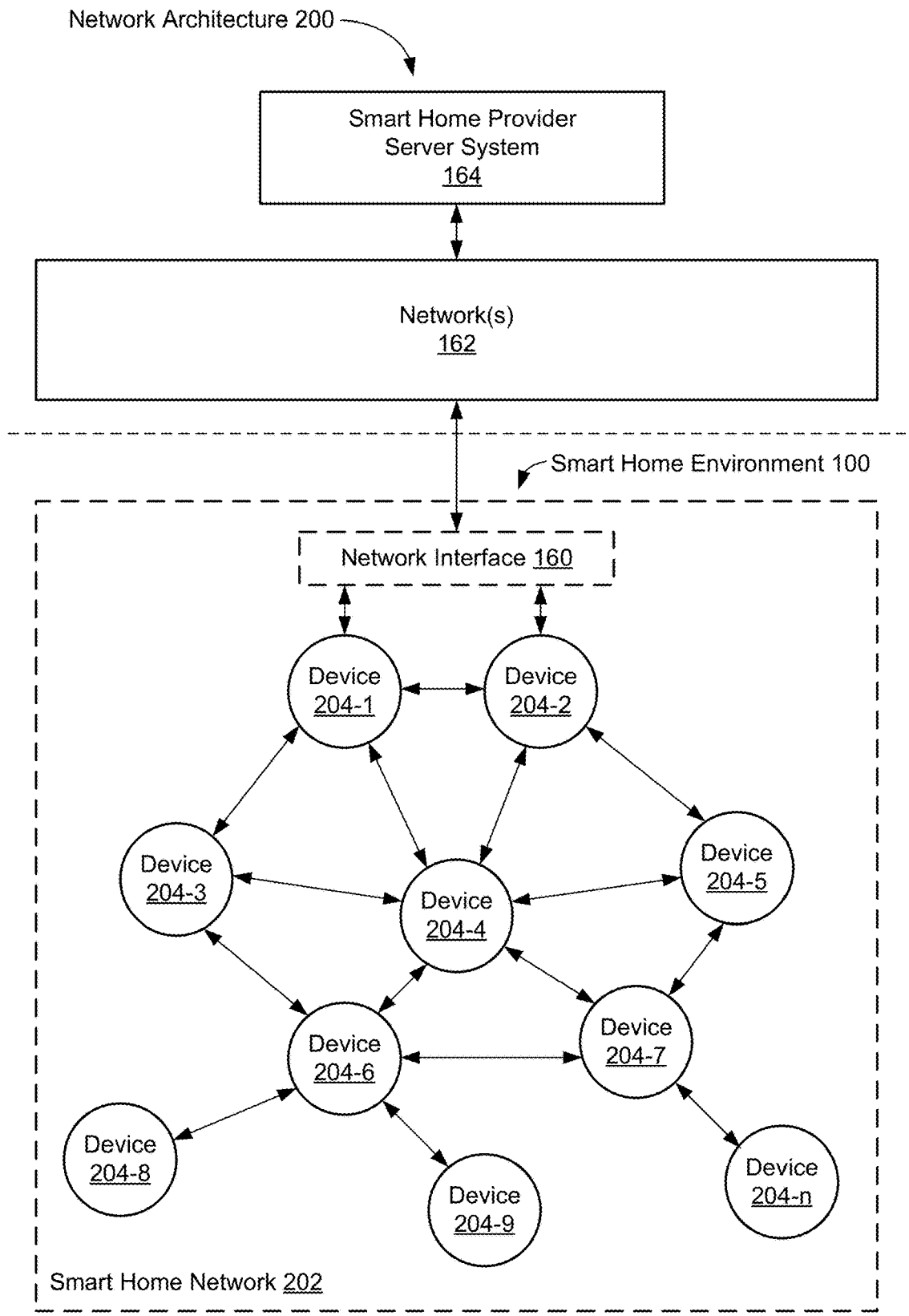
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, and/or 118) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee or 6LoWPAN.

In some implementations, some low-power nodes are incapable of bidirectional communication. These low-power nodes send messages, but they are unable to "listen." Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone)

to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

In some implementations, the smart server system 164 includes an image processing server that processes time of flight response inputs received by imaging devices 190. In some implementations, the smart server system 164 includes a device registry that keeps a record of the distributed device terminals in the smart home environment. Distributed device terminals include cast devices, media output devices, and smart home devices, including imaging devices 190. In some implementations, these distributed device terminals are linked to a user account (e.g., a Google user account) in a virtual user domain.

In some implementations, the imaging device 190 analyzes the field of view at least partially using its local image processing and storage capability. The imaging device 190 derives three-dimensional (3D) imaging information from the response signal captured by its signal detectors. In some implementations, the three-dimensional imaging information includes object locations, object movements, user gestures, and/or depth mapping. In some implementations, the imaging device 190 analyzes the field of view and determines the related 3D imaging information using image processing and storage capability of another smart device (e.g., the imaging device 190 is integrated into or connected to the other smart device). In some implementations, the imaging device (standalone or integrated in a smart device) is linked to a remote server (e.g., an image processing server within the smart server system 164) via one or more communication networks 162. In some implementations, the imaging device 190 directly transfers the received response signal to a remote server. In some implementations, the imaging device 190 partially processes the received signal, then transfers the partially processed signal to the remote server. In these cases, the imaging device at least partially relies on the remote server to analyze the field of view and derive the related 3D imaging information.

Figure 3:
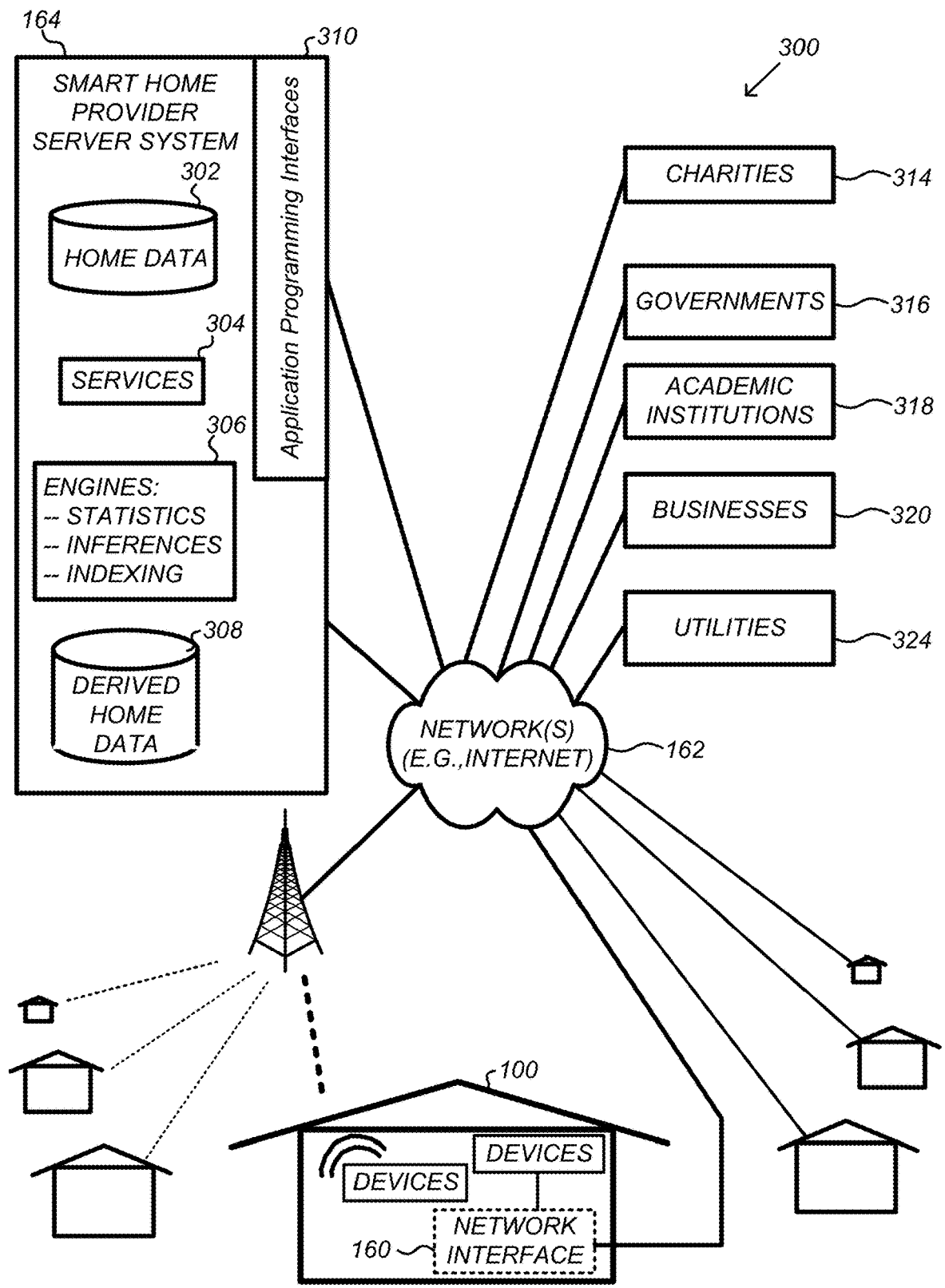
FIG. 3 illustrates a network-level view of an extensible platform for devices and services, which may be integrated with the smart home environment of FIG. 1 in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices 102, 104, 106, 108, 110, 112, 114, 116, and 118 from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature and humidity data, television viewership data, inside and outside noise level data, pressure data, and video data.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, or increase safety. In some implementations, data associated with the services 304 is stored at the smart home provider server system 164, and the smart home provider server system 164 retrieves and transmits the data at appropriate times (e.g., at regular intervals or upon receiving a request from a user).

In some implementations, the extensible devices and the services platform 300 includes a processing engine 306, which may be concentrated at a single server or distributed among several different computing entities. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, the processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service for related equipment, or targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to pre-emptively service faulty equipment, to prepare for high service demands, to track past service performance, or to perform other beneficial functions or tasks.

Figure 4:
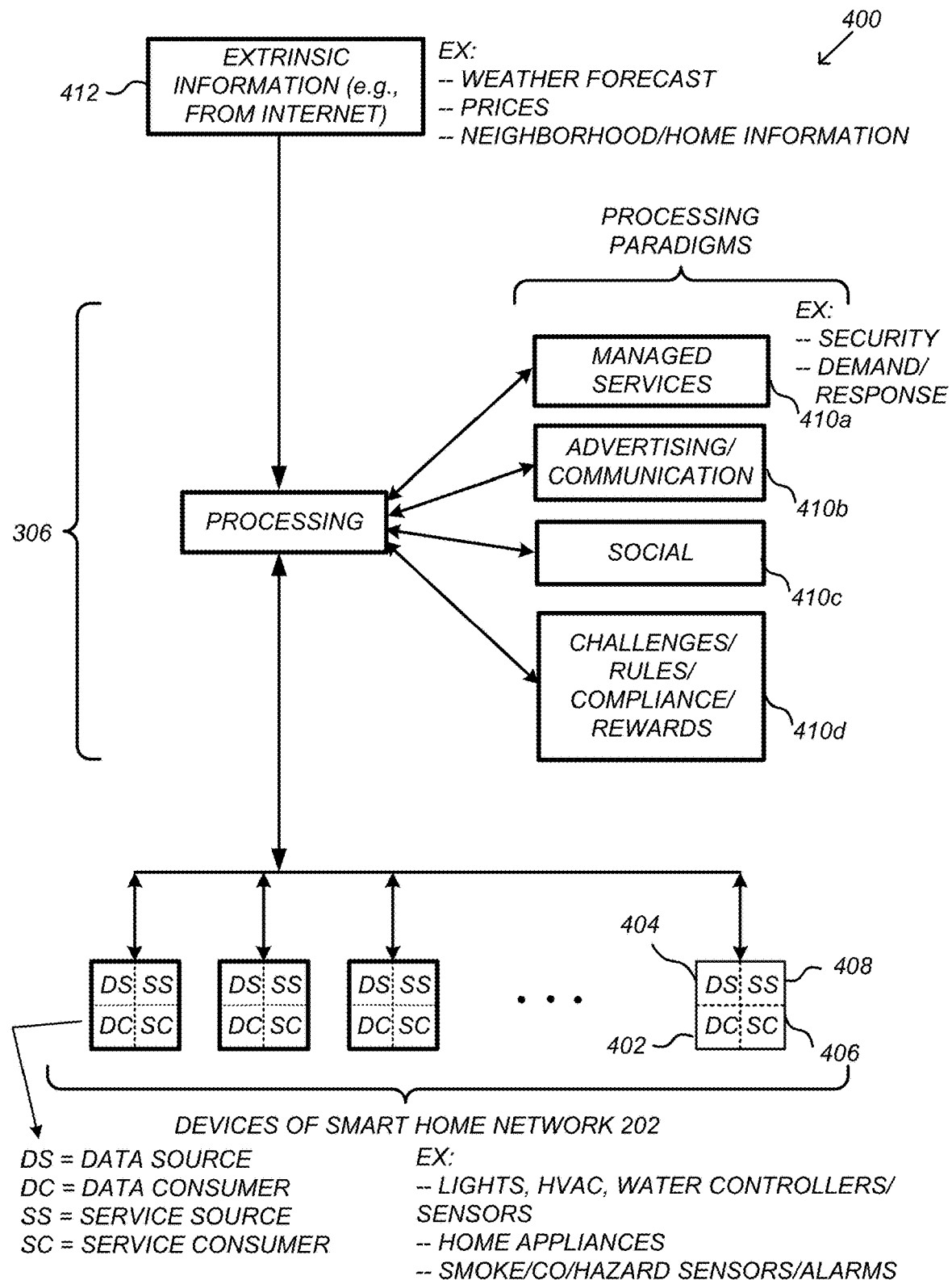
FIG. 4 illustrates an abstracted functional view of the extensible platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on usage patterns, device efficiency, and/or user input (e.g., requesting specific functionality).

FIG. 4 shows the processing engine 306 as including a number of processing paradigms 410. In some implementations, the processing engine 306 includes a managed services paradigm 410a that monitors and manages primary or secondary device functions. The device functions may include ensuring proper operation of a device given user inputs, estimating that (and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410b that estimates characteristics (e.g., demographic information), desires, and/or products of interest of a user based on device usage. Services, promotions, products, or upgrades may then be offered or automatically provided to the user. In some implementations, the processing engine 306 includes a social paradigm 410c that uses information from a social network, provides information to a social network (for example, based on device usage), and/or processes data associated with user and/or device interactions with the social network platform. For example, a user's status as reported to trusted contacts on the social network may be updated to indicate when the user is home based on light detection, security system inactivation, or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations, and/or rewards that use operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, or to improve health. For example, one challenge may involve participants turning down their thermostat by one degree for one week. Those participants that successfully complete the challenge are rewarded, such as with coupons, virtual currency, or status. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
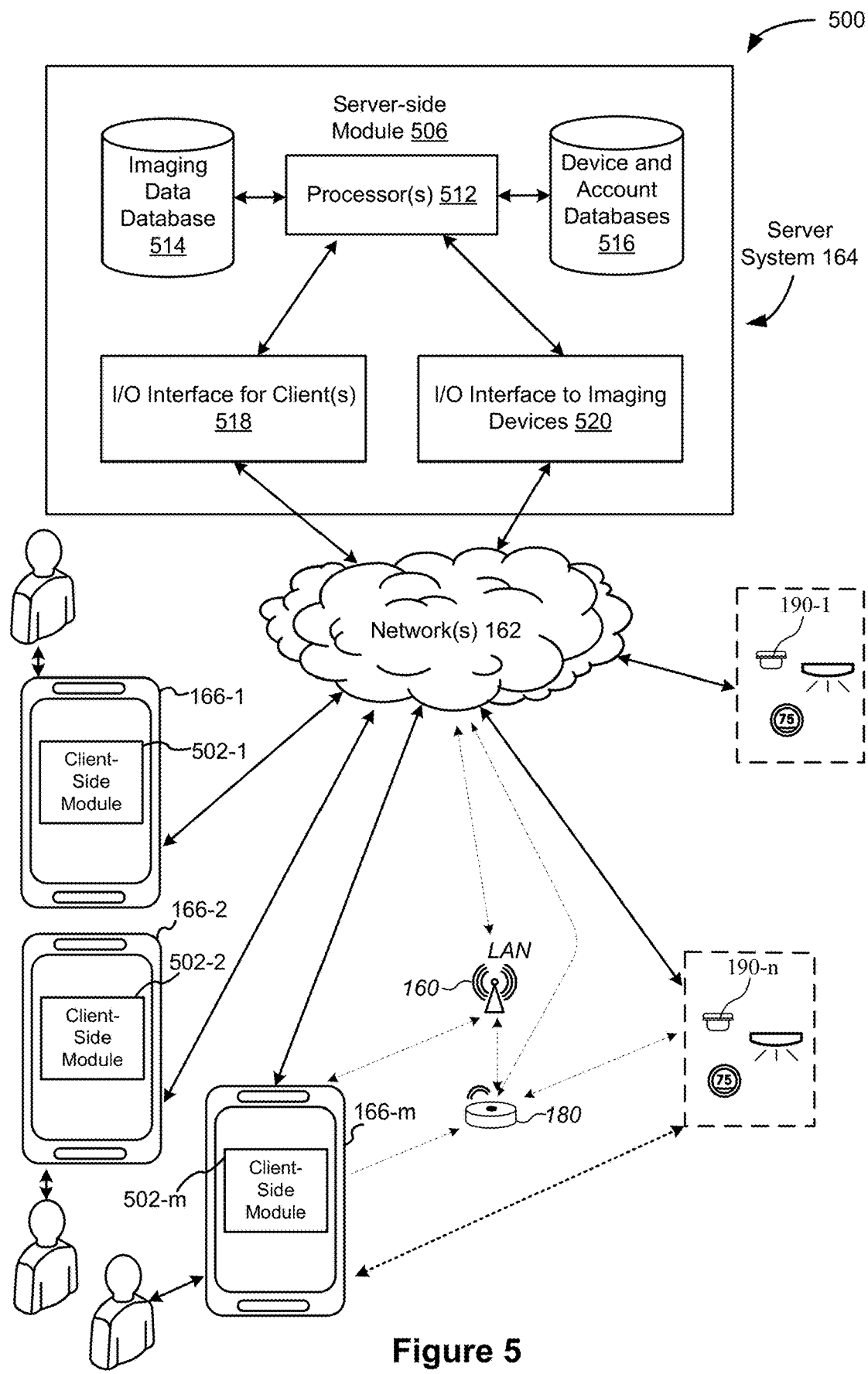
FIG. 5 is a representative operating environment in which a server system interacts with client devices, video cameras, and imaging devices in accordance with some implementations.

FIG. 5 is an example operating environment 500 in which an imaging device 190 interacts with a client device 166 or a server system 164 (e.g., an image processing server) in accordance with some implementations. In the operating environment 500, the server system 164 provides data processing for monitoring and facilitating review of object location/motion associated with imaging device data streams (e.g., raw or processed response data) captured by imaging devices 190. As shown in FIG. 5, the server system 164 receives raw or processed response data from imaging devices 190 (standalone or integrated) located at various physical locations (e.g., inside homes, restaurants, stores, streets, parking lots, and/or the smart home environments 100). Each imaging device 190 may be bound to one or more reviewer accounts, and the server system 164 may further process the received response data to obtain 3D imaging information (e.g., object locations, object movements, user gestures, and depth mapping) associated with the imaging device 190 and the corresponding reviewer accounts. In some implementations, the server system 164 provides the 3D imaging information to client devices 166 associated with the reviewer accounts. In some implementations, the server system 164 uses the 3D imaging information to control a smart home device linked to the reviewer accounts.

In some implementations, the smart home environment relies on a hub device 180 to manage smart devices located within the smart home environment, and a hub device server system associated with the hub device 180 serves as the server system 164. In some implementations, the server system 164 is a dedicated image processing server that provides data processing services to imaging devices 190 and client devices 166 independently of other services provided by the server system 164.

In some implementations, each of the imaging devices 190 captures response data using signal detectors and sends the captured response data to the server system 164 substantially in real-time. In some implementations, each of the imaging devices 190 includes a controller device (e.g., a smart home device in which an imaging device 190 is integrated) that serves as an intermediary between the imaging device 190 and the server system 164. The controller device receives the response data from the one or more imaging devices 190, optionally performs some preliminary processing on the response data, and sends the processed response data to the server system 164 on behalf of the one or more imaging devices 190 substantially in real-time. In some implementations, each imaging device 190 has its own on-board processing capabilities to perform some preliminary processing on the captured response data before sending the processed response data (along with metadata obtained through the preliminary processing) to the controller device and/or the server system 164. In some implementations, the client device 166 located in the smart home environment 100 functions as the controller device to at least partially process the captured response data.

In accordance with some implementations, each of the client devices 166 includes a client-side module 502. The client-side module 502 communicates with a server-side module 506 executed on the server system 164 through the one or more networks 162. The client-side module 502 provides client-side functionality for the 3D imaging information monitoring, review processing, and communication with the server-side module 506. The server-side module 506 provides server-side functionality for event monitoring and review processing for any number of client-side modules 502, each residing on a respective client device 166. The server-side module 506 also provides server-side functionality for response processing and imaging device control for any number of the imaging devices 190, including any number of smart home and media devices that integrate with the imaging devices 190.

In some implementations, the server-side module 506 includes one or more processors 512, an imaging data database 514, device and account databases 516, an I/O interface 518 to one or more client devices, and an I/O interface 520 to one or more imaging devices 520. The I/O interface 518 to one or more clients facilitates the client-facing input and output processing for the server-side module 506. The device and account databases 516 store a plurality of profiles for reviewer accounts registered with the server system 164. A user profile includes account credentials for each reviewer account, and identifies one or more imaging devices 190 linked to the reviewer account. In some implementations, the user profile of each reviewer account includes information related to capabilities, device characteristics, and lookup tables for the imaging devices 190 linked to the reviewer account. The I/O interface 520 to one or more imaging devices facilitates communications with one or more imaging devices 190 (standalone or integrated). The imaging data database 514 stores raw or processed response data received from the imaging devices 190 and associated 3D imaging information, as well as various types of metadata, such as device characteristics of signal emitters and detectors, lookup tables, modulation signals, and sampling rates. In some implementations, this data is used for generating the 3D imaging information associated with a field of view for each reviewer account.

Client devices 166 include handheld computers, wearable computing devices, personal digital assistants (PDAs), tablet computers, laptop computers, desktop computers, cellular telephones, smart phones, enhanced general packet radio service (EGPRS) mobile phones, media players, navigation devices, game consoles, televisions, remote controls, point-of-sale (POS) terminals, vehicle-mounted computers, ebook readers, or a combination of any two or more of these data processing devices or other data processing devices.

Examples of the one or more networks 162 include local area networks (LANs) and wide area networks (WANs) such as the Internet. In some implementations, the one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing devices or a distributed network of computers. In some implementations, the server system 164 employs various virtual devices and/or services of third party service providers (e.g., third-party cloud service providers) to provide the underlying computing resources and/or infrastructure resources of the server system 164. In some implementations, the server system 164 includes handheld computers, tablet computers, laptop computers, desktop computers, or a combination of any two or more of these data processing devices or other data processing devices.

The server-client environment 500 shown in FIG. 5 includes both a client-side portion (e.g., the client-side module 502) and a server-side portion (e.g., the server-side module 506). The division of functionality between the client and server portions of operating environment 500 can vary in different implementations. Similarly, the division of functionality between the imaging device 190 and the server system 164 can vary in different implementations. In some implementations, the client-side module 502 is a thin-client that provides only user-facing input and output processing functions, and delegates other data processing functionality to a backend server (e.g., the server system 164). In some implementations, an imaging devices 190 is a simple video capturing device that continuously captures and streams response data to the server system 164, with limited local preliminary processing of the imaging data. Although many aspects of the present technology are described from the perspective of an electronic device (e.g., the imaging devices 190), the corresponding actions performed by the client device 166 and/or the server system 164 would be apparent to those of skill in the art. Some aspects of the present technology may be described from the perspective of the client device or the server system, and the corresponding actions performed by the server system would be apparent to those of skill in the art. Furthermore, some aspects of the present technology may be performed by the server system 164, the client device 166, and the imaging devices 190 cooperatively.

It should be understood that the operating environment 500 that involves the server system 164, the client device 166, and the imaging device 190 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, and smart appliances 112).

The electronic devices, the client devices, and the server system communicate with each other using the one or more communication networks 162. In an example smart home environment 100, two or more devices (e.g., the network interface device 160, the hub device 180, the client devices 166, and the smart devices 204) are located in close proximity to each other, such that they can be communicatively coupled in the same sub-network via wired connections, a WLAN, or a Bluetooth Personal Area Network (PAN). The Bluetooth PAN is optionally established based on classical Bluetooth technology or Bluetooth Low Energy (BLE) technology. In some implementations, each of the hub device 180, the client device 166, and the smart devices 204 are communicatively coupled to the networks 162 via the network interface device 160.

The operating environment 500 further includes one or more other radio communication networks through which at least some of the electronic devices (e.g., an imaging device 190) exchanges data with the hub device 180. In some implementations, the hub device 180 is communicatively coupled directly to the networks 162. In some implementations, the hub device 180 is communicatively coupled indirectly to the networks 162 via the network interface device 160. During typical operation, the network interface device 160 and the hub device 180 communicate with each other to form a network gateway through which data is exchanged with the imaging devices 190. In some implementations, both the client device 166 and the imaging devices 190 communicate directly via the networks 162 without passing the network interface device 160 or the hub device 180.

Figure 6:
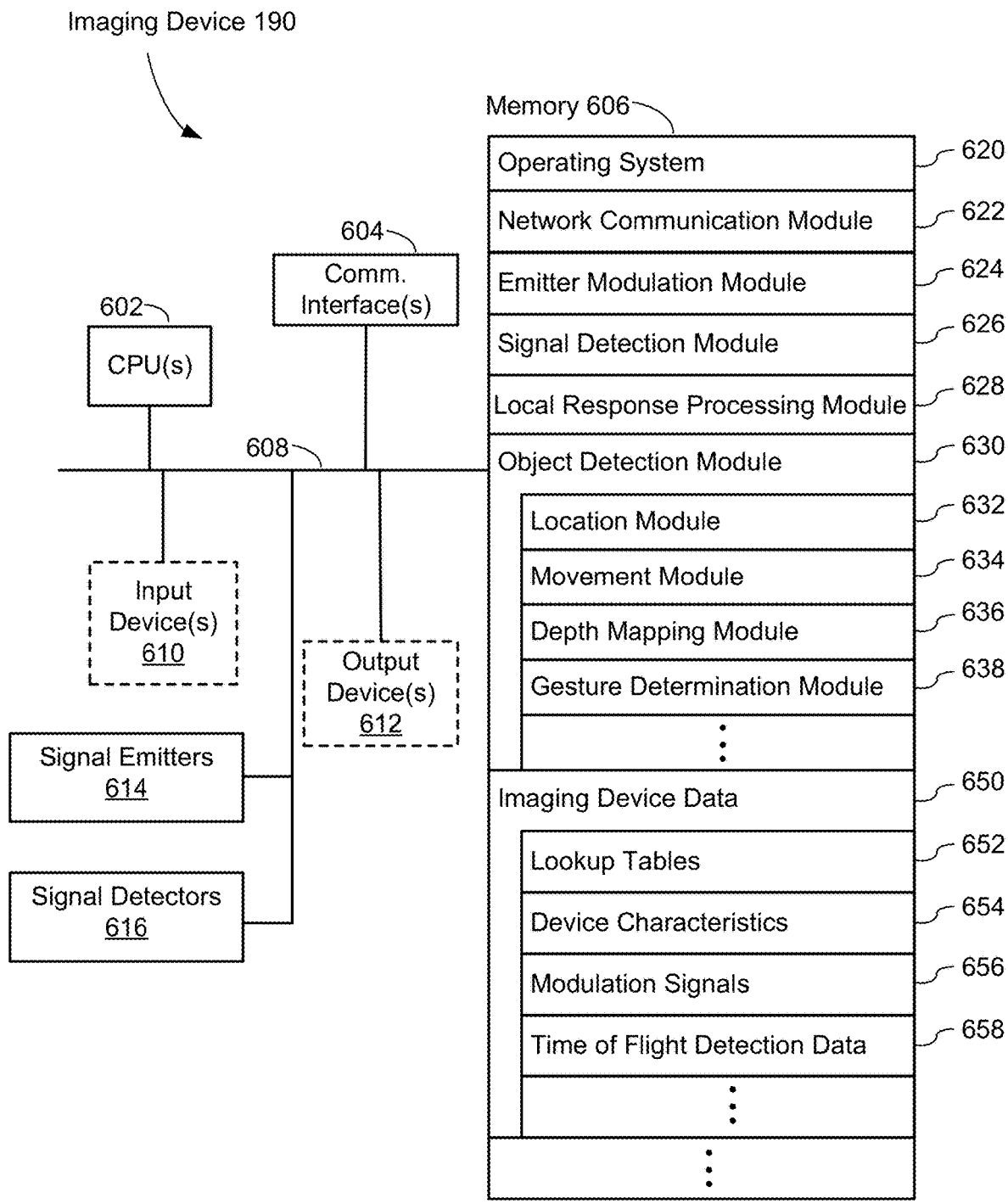
FIG. 6 is a block diagram illustrating an imaging device in accordance with some implementations.

FIG. 6 is a block diagram illustrating an imaging device 190 in accordance with some implementations. The imaging device 190 typically includes one or more processing units (CPUs) 602, one or more network interfaces 604, memory 606, and one or more communication buses 608 for interconnecting these components (sometimes called a chipset). In some implementations, the imaging device 190 includes one or more input devices 610. These input devices, such as a button or a touch sense array facilitate user input. In some implementations, the electronic device 190 also includes one or more output devices 612, such as a touch screen display, speaker, or an array of full color LEDs.

The imaging device 190 includes one or more signal emitters 614, and typically includes a plurality of signal emitters. In some implementations, the signal emitters are LEDs. In some implementations, the signal emitters emit other wave forms, including various electromagnetic wavelengths (e.g., infrared, visible, or ultraviolet), acoustic waves, or ultrasonic waves. The imaging device 190 also includes one or more signal detectors 616, such as a photodiode. The signal detectors 616 detect signals corresponding to the signals emitted by the signal emitters 614.

Figure 9:
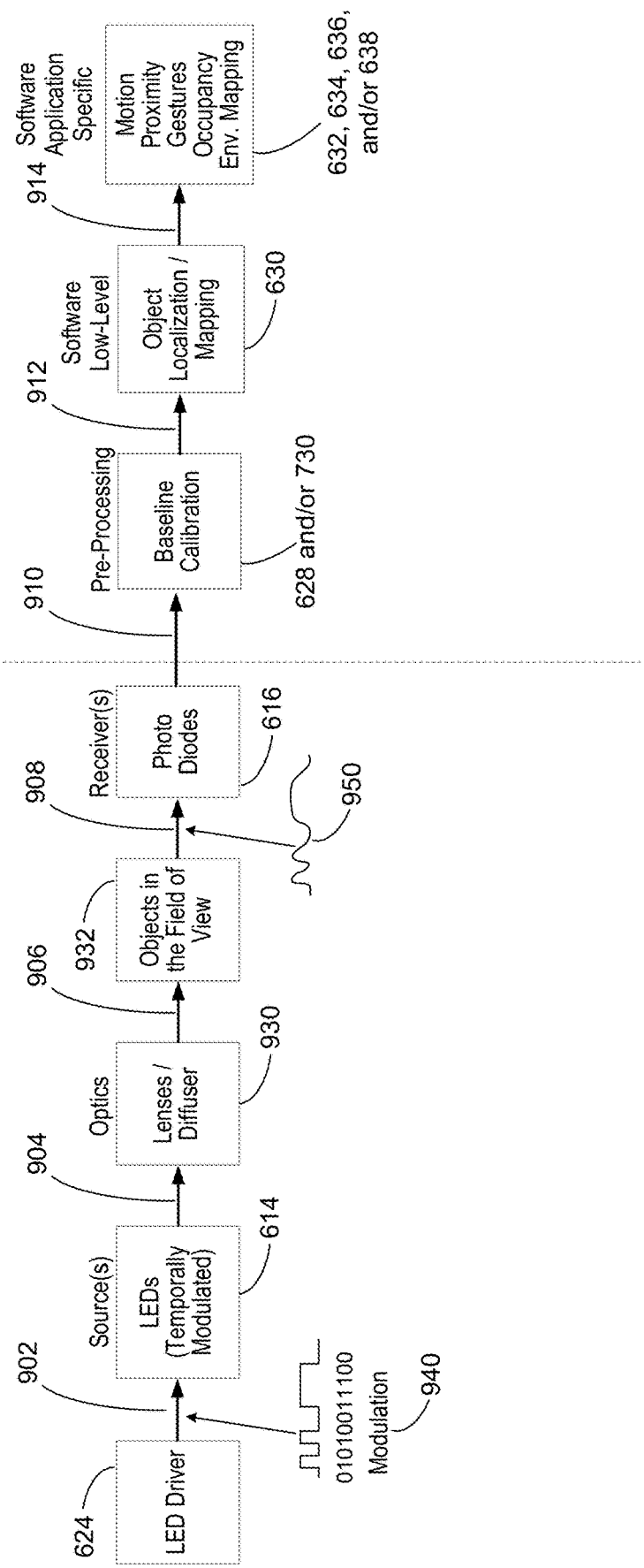
FIG. 9 is a flowchart of a process for determining three-dimensional locations of objects in a field of view without using a camera, in accordance with some implementations.

The memory 606 includes high-speed random access memory, such as DRAM, SRAM, DDR RAM, or other random access solid state memory devices. In some implementations, the memory 606 includes non-volatile memory, such as one or more magnetic disk storage devices, one or more optical disk storage devices, one or more flash memory devices, or one or more other non-volatile solid state storage devices. In some implementations, the memory 606 includes one or more storage devices remotely located from one or more processing units 602. The memory 606, or alternatively the non-volatile memory within memory 606, includes a non-transitory computer readable storage medium. In some implementations, the memory 606 or the non-transitory computer readable storage medium of the memory 606, stores the following programs, modules, and data structures, or a subset or superset thereof:

an operating system 620, which includes procedures for handling various basic system services and for performing hardware dependent tasks;

a network communication module 622 for connecting the imaging device 190 to other devices (e.g., the server system 164, a client device 166, and/or other smart home devices 204) via one or more network interfaces 604 (wired or wireless) and one or more networks 162, such as the Internet, other wide area networks, local area networks, metropolitan area networks, and so on;

an emitter modulation module 624, which generates a modulation signal 656 to control the operation of the signal emitters 614. In some implementations, the generated modulation signal 656 corresponds to a pseudorandom sequence of zeros and ones. In some implementations, the same modulation signal 656 is used simultaneously for each of the signal emitters 614. In some implementations, each of the signal emitters 614 has a distinct modulation signal 656. The modulation signal 656 specifies whether a signal emitter is on or off, and specifies the length of time the signal emitter is on or off. In some implementations, the modulation signal 656 also specifies a magnitude or intensity of the illumination created by the signal emitters 614;

a signal detection module 626, which processes the signals received by the signal detectors 616. The signal detection module 626 compares the modulated signal 656 created by the signal emitters 614 to the received signals 658 at the signal detectors 616 to determine total "time of flight" from the emitters 614 to objects in the field of view and reflected back to the detectors 616;

a local response processing module 628, which performs preliminary processing on the received signals 658. In some implementations, the local processing module 628 samples the received signals 658 at multiple points in time (e.g., every microsecond, every 10 microseconds, or every 100 microseconds) to create digital data from the received analog signal. In some implementations, the local response processing module 628 normalizes the signal intensity;

an object detection module 630, which determines characteristics about the field of view and objects in the field of view. This is illustrated in FIG. 9 below. In some implementations, the object detection module 630 includes an object location module 632, which identifies the position of objects in the field of view based on the time of flight data 658. In some implementations, the object detection module 630 includes an object movement module 634, which identifies object motion based on temporal changes in object position. In some implementations, the object movement module 634 also utilizes object size based on the general rule that objects do not typically grow or shrink substantially in a short amount of time. Some implementations include a gesture determination module 638, which uses the movement data to form gestures, and compares observed gestures to known saved gestures. In some implementations, gestures are stored for individual users and can be created by individual users to correspond to a command. In some implementations, the time of flight data 658 is used to form a depth map of the field of view from the point of view of the imaging device. In some implementations, the depth mapping module 636 uses the time of flight data 658 to estimate a probability that each voxel in the field of view is filled. By combining all of these probabilities, the depth mapping module 636 estimates a depth from the imaging device to the nearest object for each pixel in a two-dimensional image of the field of view;

imaging device data 650, which is used by the local response processing module 628 and/or the object detection module 630. In some implementations, the imaging device data 650 includes one or more lookup tables 652, as described in more detail below. The lookup tables 652 are created by computer simulation and/or actual experiments with an imaging device. In some implementations, device characteristics 654 of the imaging device 190 are used to build the lookup tables 652 and by the emitter modulation module 624 when creating the modulation signals 656. The device characteristics 654 can include the number, type, and placement of the signal emitters 614, as well as the number, type, and placement of the signal detectors 616.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, modules or data structures, and thus various subsets of these modules may be combined or otherwise rearranged in various implementations. In some implementations, the memory 606 stores a subset of the modules and data structures identified above. In some implementations, the memory 606 stores additional modules and data structures not described above.

Figure 7:
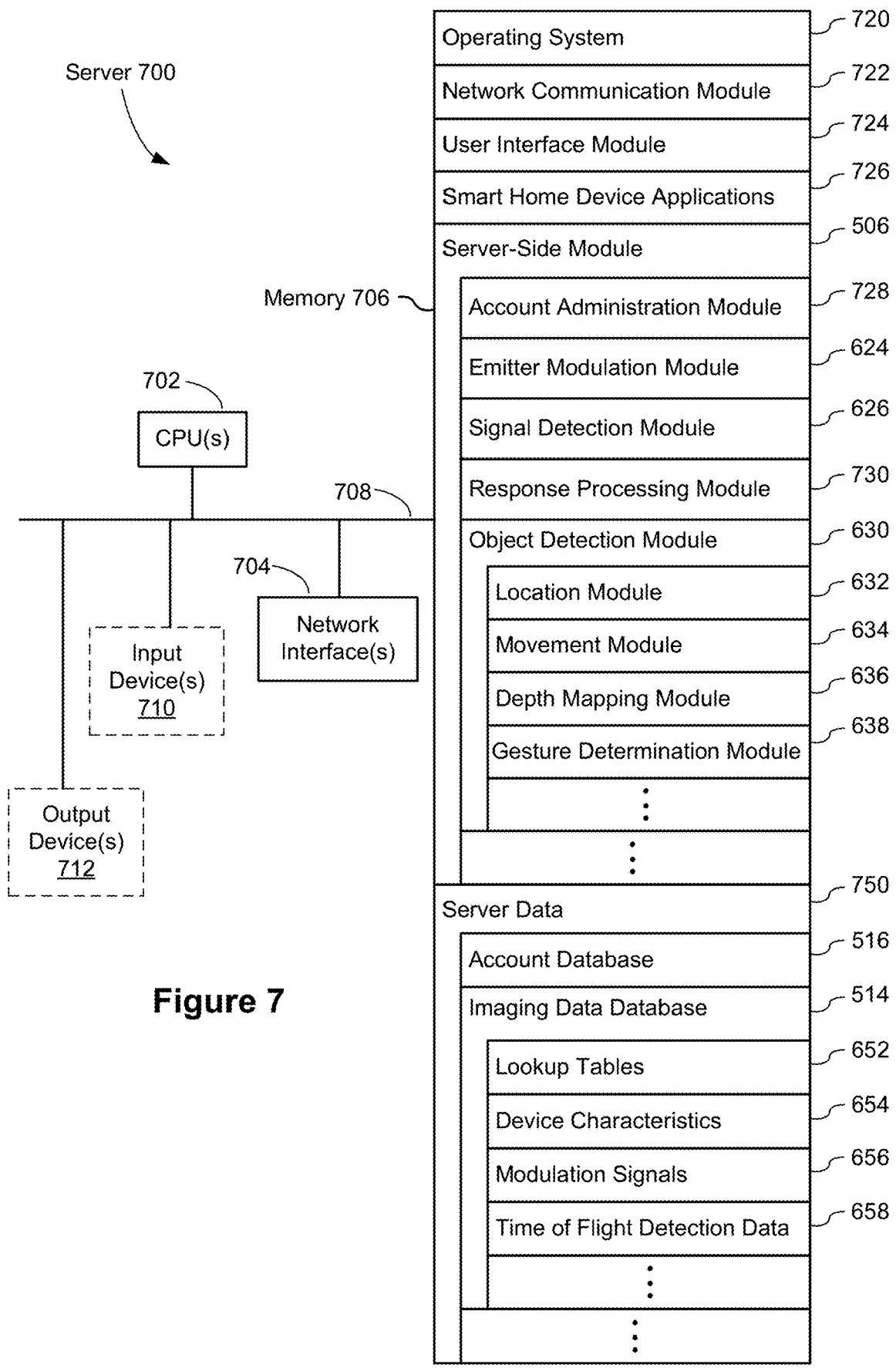
FIG. 7 is a block diagram illustrating a server of a server system in accordance with some implementations.

FIG. 7 is a block diagram illustrating a server 700 in the server system 164 of a smart home environment 100 in accordance with some implementations. A server system 164 typically includes a plurality of individual servers 700 (e.g., 10, 100, or 1000 individual servers 700). The server 700 includes one or more processing units (CPUs) 702, one or more network interfaces 704, memory 706, and one or more communication buses 708 for interconnecting these components (sometimes called a chipset). In some implementations, the server 700 includes one or more input devices 710, which facilitate user input, such as a keyboard, a mouse, a voice-command input unit or microphone, a touch screen display, a touch-sensitive input pad, a gesture capturing camera, or other input buttons or controls. In some implementations, the server 700 uses a microphone and voice recognition or a camera and gesture recognition to supplement or replace the keyboard. In some implementations, the server 700 includes one or more cameras, scanners, or photo sensor units for capturing images. In some implementations, the server 700 includes one or more output devices 712, which enable presentation of user interfaces and display content, including one or more speakers and/or one or more visual displays.

The memory 706 includes high-speed random access memory, such as DRAM, SRAM, DDR RAM, or other random access solid state memory devices. In some implementations, the memory 706 includes non-volatile memory, such as one or more magnetic disk storage devices, one or more optical disk storage devices, one or more flash memory devices, or one or more other non-volatile solid state storage devices. In some implementations, the memory 706 includes one or more storage devices remotely located from the processing units 702. The memory 706, or alternatively the non-volatile memory within the memory 706, includes a non-transitory computer readable storage medium. In some implementations, the memory 706, or the non-transitory computer readable storage medium of the memory 706, stores the following programs, modules, and data structures, or a subset or superset thereof:

- an operating system 720, which includes procedures for handling various basic system services and for performing hardware dependent tasks;
- a network communication module 722, which connects the server 700 to other devices (e.g., various servers in the server system 164, a client device 166, or smart home devices 204) via one or more network interfaces 704 (wired or wireless) and one or more networks 162, such as the Internet, other wide area networks, local area networks, metropolitan area networks, and so on;
- a user interface module 724, which enables presentation of information (e.g., a graphical user interface for presenting applications, widgets, websites and web pages thereof, and/or games, audio and/or video content) at a client device 166;
- one or more smart home device applications 726, which are executed to provide server-side functionality for device provisioning, device control, data processing, and data review of corresponding smart home devices 204;
- a server-side module 506, which communicates both with smart home environments 100 and with client-side modules 502. The server-side module 506 includes a plurality of individual programs, procedures, modules, and/or objects for performing a variety of functions. In some implementations, the server-side module 506 acts as a control layer or API to the underlying functionality. In some implementations, the server-side module includes one or more of an emitter modulation module 624, a signal detection module 626, an object detection module 630, a location module 632, a movement module 634, a depth mapping module 636, and/or a gesture determination module 638, as described above in FIG. 6 for an imaging device 190. Some implementations implement all of these features at a server 700, some implementations implement all of these features at the imaging device 190, and some implementations distribute the functionality between the server and the imaging device (e.g., based on efficiency considerations). In some implementations, the server-side module 506 includes a response processing module 730, which receives either raw unprocessed signals received at an imaging device 190 or signals that have been preprocessed by a local response processing module 628 at the imaging device 190. The response processing module 730 prepares the response data (e.g., time of flight detection data 658) for use by the location module 632, the movement module 634, the depth mapping module 636, and/or the gesture determination module 638. The server-side module 506 also includes an account administration module 728, which enables users to set up smart home environments 100 and to identify the smart devices 204 associated with the smart home environment;
- server data 750, which includes data associated with smart home environments. The server data 750 includes an account database 516 and an imaging data database 514, as described above with respect to FIG. 5. In some implementations, the imaging data database 514 includes lookup tables 652, device characteristics 654, modulation signals 656, and/or time of flight detection data 658. In some implementations, this data is downloaded to an imaging device 190 or a client device 166.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, modules, or data structures, and thus various subsets of these modules may be combined or otherwise rearranged in various implementations. In some implementations, the memory 706 stores a subset of the modules and data structures identified above. In some implementations, the memory 706 stores additional modules and data structures not described above.

Figure 8:
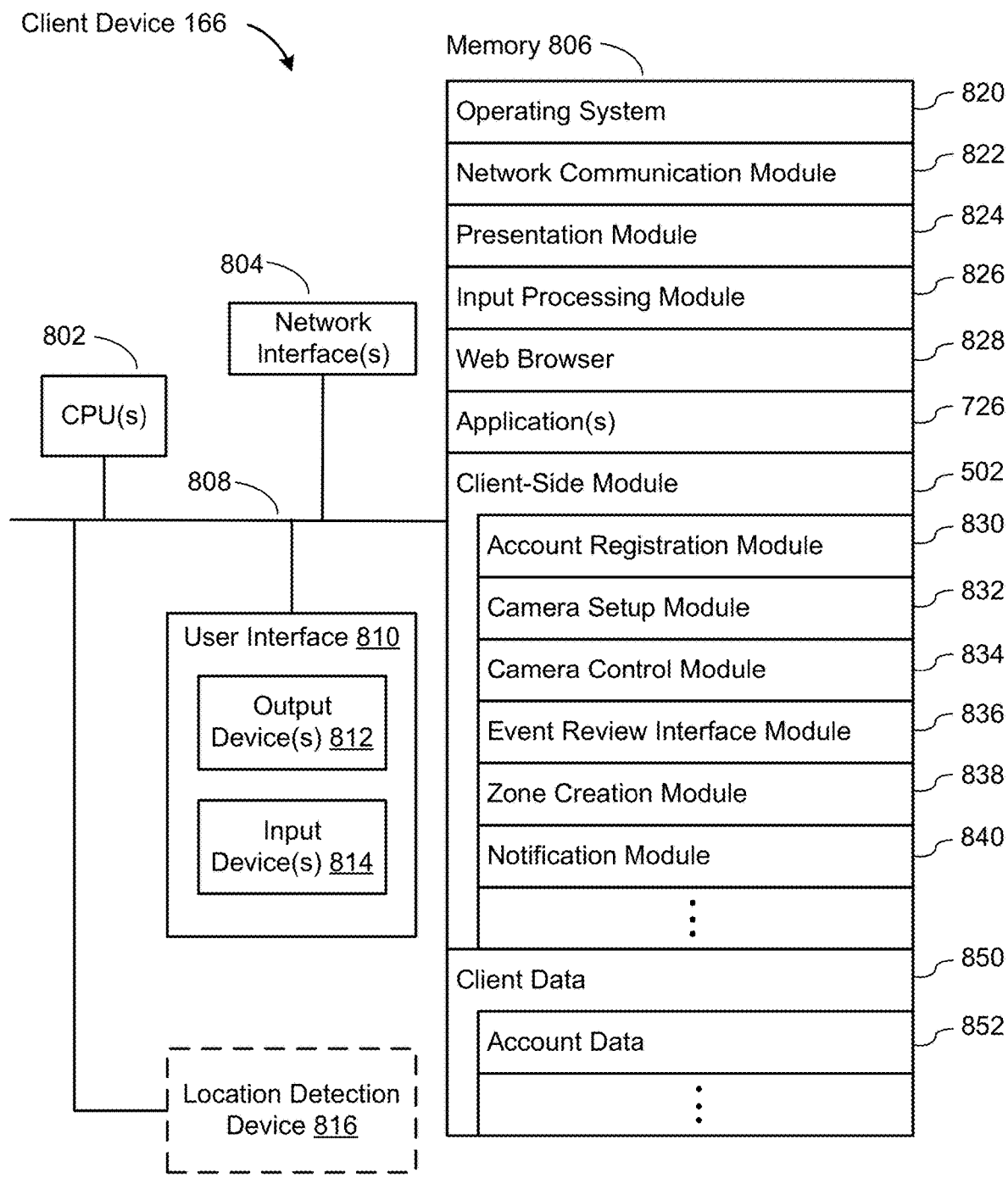
FIG. 8 is a block diagram illustrating a client device in accordance with some implementations.

FIG. 8 is a block diagram illustrating a representative client device 166 in accordance with some implementations. The client device 166 typically includes one or more processing units (CPUs) 802, one or more network interfaces 804, memory 806, and one or more communication buses 808 for interconnecting these components (sometimes called a chipset). The client device 166 also includes a user interface 810. The user interface 810 includes one or more output devices 812 that enable presentation of media content, including one or more speakers and/or one or more visual displays. The user interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. In some implementations, the client device 166 uses a microphone and voice recognition or a camera and gesture recognition to supplement or replace the keyboard. In some implementations, the client device 166 includes one or more cameras, scanners, or photo sensor units for capturing images. In some implementations, the client device 166 includes a location detection device 816, such as a GPS (global positioning satellite) or other geo-location receiver, for determining the location of the client device 166.

The memory 806 includes high-speed random access memory, such as DRAM, SRAM, DDR RAM, or other random access solid state memory devices. In some implementations, the memory 806 includes non-volatile memory, such as one or more magnetic disk storage devices, one or more optical disk storage devices, one or more flash memory devices, or one or more other non-volatile solid state storage devices. In some implementations, the memory 806 includes one or more storage devices remotely located from the one or more processing units 802. The memory 806, or alternatively the non-volatile memory within the memory 806, comprises a non-transitory computer readable storage medium. In some implementations, the memory 806, or the non-transitory computer readable storage medium of the memory 806, stores the following programs, modules, and data structures, or a subset or superset thereof:

- an operating system 820, which includes procedures for handling various basic system services and for performing hardware dependent tasks;
- a network communication module 822, which connects the client device 166 to other computing devices, such as the server system 164, using one or more networks 162 via the one or more network interfaces 804 (wired or wireless);
- a presentation module 824, which enables presentation of information (e.g., user interfaces for the applications 726, user interface elements for the client-side module 502, widgets, websites, and web pages thereof, and/or games, audio and/or video content) at the client device 166 via the one or more output devices 812 (e.g., displays and speakers);

an input processing module 826, which detects one or more user inputs or interactions from one of the one or more input devices 814 and interprets the detected input or interaction;

a web browser 828, which is used by a user for navigating the Internet, requesting specific web pages (e.g., via HTTP), and displaying websites and web pages thereof. The websites include a web interface for logging into a reviewer account, controlling the video sources associated with the reviewer account, establishing and selecting event filters, and editing and reviewing motion events detected in the video streams of the video sources;

one or more applications 726, which execute at the client device 166 (e.g., games, social network applications, smart home applications, and/or other web or non-web based applications). In some implementations, one or more of the applications 726 are provided by the server system 164;

a client-side module 502, which provides client-side data processing and functionality for monitoring a smart home environment 100, including video cameras 118 and imaging devices 190. The client-side module 506 also enables a user to review motion events detected in the video streams from one or more video cameras 118. In some implementations, the client-side module 502 includes:

an account registration module 830, which a user accesses to establish a reviewer account and register one or more video cameras 118, imaging devices 190, or other smart devices 204 with the server system 164;

a camera setup module 832, which enables users to set up one or more video sources within a local area network, and enables the one or more video sources to access the server system 164 on the Internet through the local area network. In some implementations, the camera setup module is also used to set up the imaging devices 190;

a camera control module 834, which generates control commands for modifying an operating mode of the one or more video sources in accordance with user input;

an event review interface module 836, which provides user interfaces for reviewing event timelines, editing event categorization results, selecting event filters, presenting real-time filtered motion events based on existing and newly created event filters (e.g., event categories, zones of interest, and human filters), presenting real-time notifications (e.g., pop-ups) for newly detected motion events, and presenting smart time-lapse of selected motion events;

a zone creation module 838, which provides a user interface for creating zones of interest for each video stream in accordance with user input, and sending the definitions of the zones of interest to the server system 164; and a notification module 840, which generates real-time notifications for all or selected motion events on the client device 166 outside of the event review user interface; and client data 850, which includes data associated with reviewer accounts, video cameras 118, imaging devices 190, and other smart devices 204. In some implementations, the client data 850 includes account data 852. The account data 852 includes information related to reviewer accounts, video cameras 118, and imaging devices 190, such as cached login credentials, device characteristics, user interface settings, and display preferences.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, modules, or data structures, and thus various subsets of these modules may be combined or otherwise rearranged in various implementations. In some implementations, the memory 806 stores a subset of the modules and data structures identified above. In some implementations, the memory 806 stores additional modules and data structures not described above.

In some implementations, at least some of the functions of the server system 164 are performed by the client device 166, and the corresponding sub-modules of these functions may be located within the client device 166 rather than the server system 164. In some implementations, at least some of the functions of the client device 166 are performed by the server system 164, and the corresponding sub-modules of these functions may be located within the server system 164 rather than the client device 166. The client device 166 and the server system 164 in FIGS. 5, 7, and 8 illustrate some implementations, but many different configurations of the modules for implementing the functions described herein are possible based on the disclosure.

FIG. 9 is a flowchart of a process for determining three-dimensional locations of objects in a field of view without using a camera. As described above, the process uses a small number of signal emitters 614 (e.g., LEDs) and a small number of signal detectors 616 (e.g., photodiodes). In this example, an LED driver 624 generates (902) a modulation signal 940. In some implementations, this is encoded as a sequence of zeros and ones. In this scenario, each 0 or 1 represents a unit of time in which the modulation signal is low or high (e.g., off or on). In some implementations, the modulation signal 940 is pseudo-random.

The LEDs 614 generate (904) light of a known wavelength (e.g., visible or infrared) according to the modulation signal 940. In some implementations, a single modulation signal is used to drive all of the LEDs. In other implementations, each LED has its own distinct modulation signal. Some implementations have multiple modulation signals, but each signal can drive one or more LEDs.

In some implementations, the generated signal (e.g., light) is passed through one or more optical elements 930, such as one or more lenses or a diffuser, creating (906) the signal that is projected into the field of view of the imaging device 190. In general, there are one or more objects 932 in the field of view that are close enough to reflect (908) the signal back to the imaging device 190, and the reflected signals 950 are detected by the photodiodes 616.

The raw signals received by the photodiodes are forwarded (910) for processing by the local response processing module 628 at the imaging device 190 and/or the response processing module 730 at the server system 164. This pre-processing phase performs various operations on the received analog signal. In some implementations, the pre-processing samples the analog signal at multiple points in time (e.g., every T microseconds, where T is a stored parameter) to convert the analog signal into a sequence of digital values. In some implementations, the pro-processing phase performs baseline calibration by subtracting a signal corresponding to the background signal received at the photodiodes (removing the effect of ambient light).

Typically, the pre-processor 628 or 730 sends (912) the modified data to a low level object detection module 630 to localize objects in the field of view. In some implementations, the object detection module 630 creates a map that indicates which voxels in the field of view are filled or specifies a probability that each voxel is filled.

The voxel data is then used (914) by subsequent modules to identify motion, proximity, gestures, occupancy of the field of view by people (or pets), and environmental mapping. These higher level software applications typically use other data as well, such as voxel information over a period of time or voxel information from an earlier period of time.

Figure 10B:
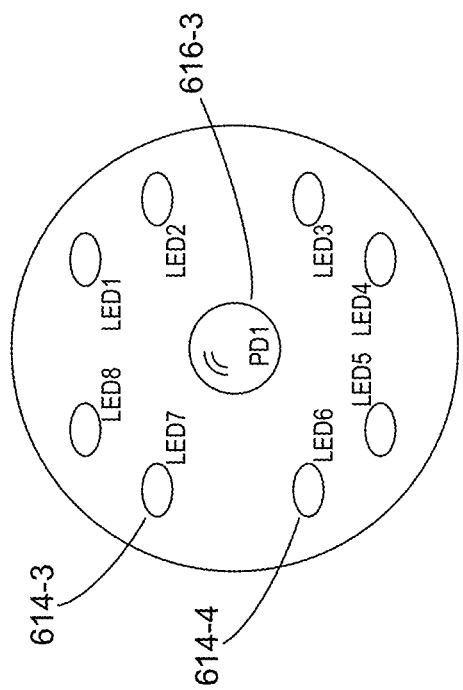
FIGS. 10B and 10C illustrate distributing signal emitters 614 and signal detectors 616 on an imaging device 190 in accordance with some implementations.
Figure 10C:
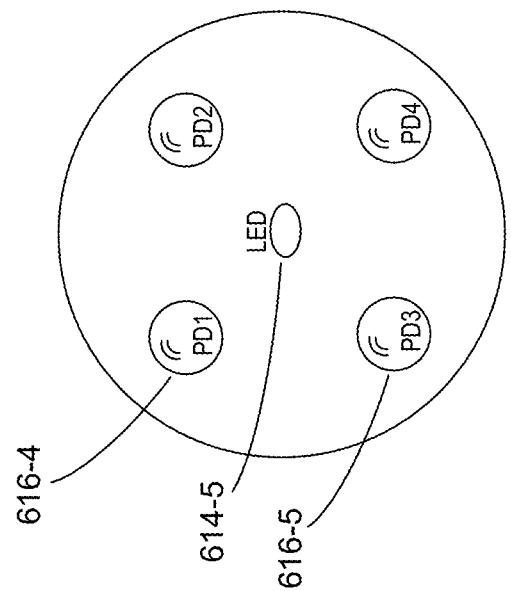
Figure 10A:
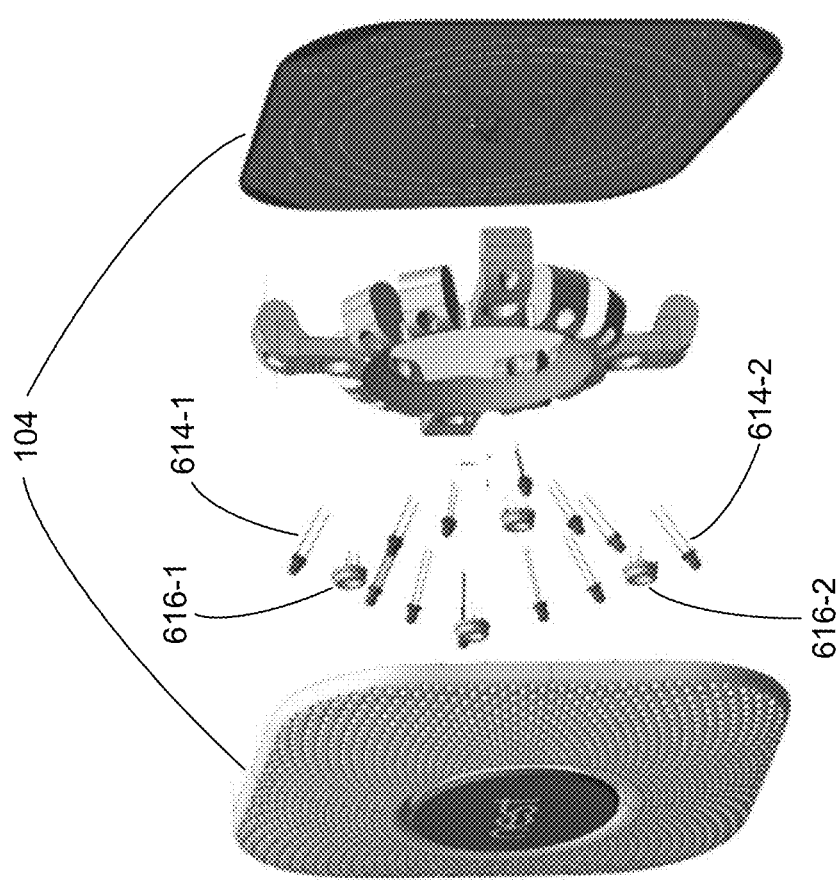
FIG. 10A is an exploded view of an imaging device 190 embedded in a smart hazard detector 104, in accordance with some implementations.

FIG. 10A is an exploded view of an imaging device 190 embedded in a smart hazard detector 104. The elements of the imaging device 190 include a plurality of signal emitters 614, including LEDs 614-1 and 614-2, as well as a plurality of signal detectors 616, including photodiodes 616-1 and 616-2. Because hazard detectors 104 are typically included in many rooms of a household (e.g., by law), integrating imaging device 190 into these hazard detectors provides additional functionality without adding additional clutter.

FIG. 10B illustrates one implementation of distributing signal emitters 614 and signal detectors 616 on an imaging device 190. In this implementation, there is a single signal detector 616-3 and eight signal emitters 614, including LED7 614-3 and LED6 614-4. In this implementation, there are more signal emitters than signal detectors.

FIG. 10C illustrates another implementation of distributing signal emitters 614 and signal detectors 616 on an imaging device 190. In this implementations, there is a single signal emitter 614-5, and four signal detectors 616, including signal detector PD1 616-4 and signal detector PD3 616-5. In this implementation, there are more signal detectors 616 than signal emitters 614.

Figure 11:
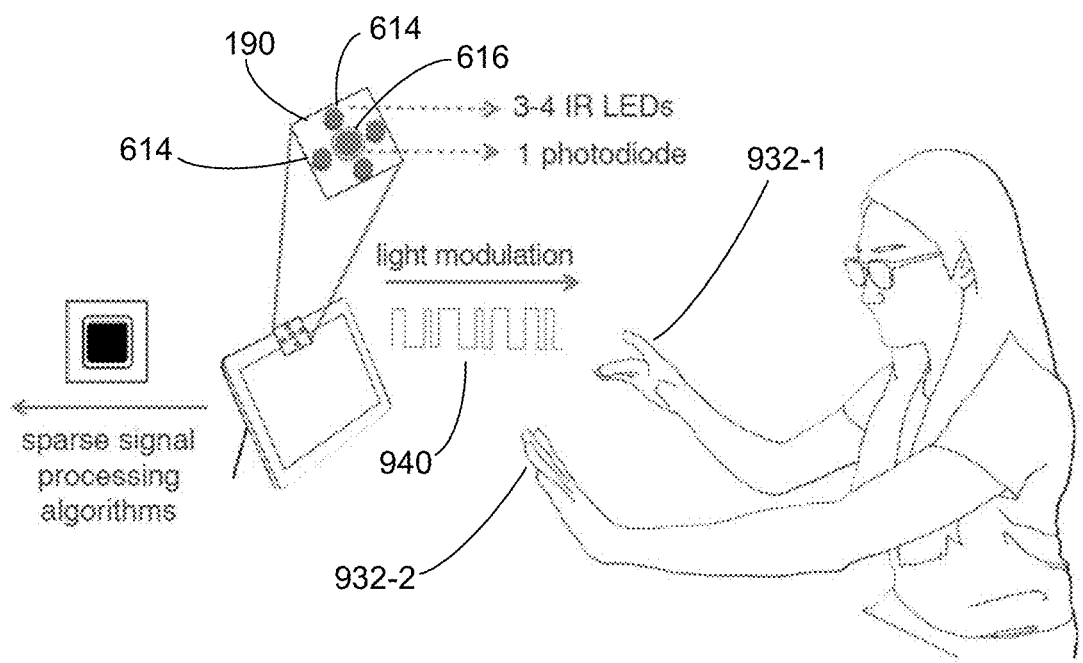
FIG. 11 illustrates using an imaging device 190 to identify hand gestures in accordance with some implementations.

FIG. 11 illustrates using an imaging device 190 to identify hand gestures in accordance with some implementations. In this example, the imaging device 190 has four signal emitters 614 (infrared LEDs) and a single photodiode 616. The signal emitters 614 create a modulated signal 940, which is transmitted into the field of view. The signals are partially reflected by the objects 932-1 and 932-2 (the user's hands) in the field of view, and the reflected signals are picked up by the signal detector 616. The detected signals are then processed using sparse signal processing algorithms. The processing algorithms can be implemented at the imaging device 190, at an associated computing device (e.g., a client device 166), or at a remote device (e.g., a server system 164). In this example, the imaging device has no camera, uses no lenses, uses very low power, and provides millimeter accuracy.

Figure 12C:
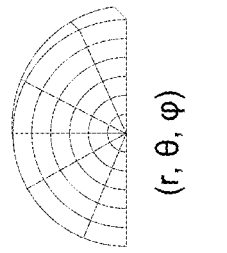
FIGS. 12A-12C illustrate several ways to partition a field of view into a plurality of voxels, in accordance with some implementations.
Figure 12B:
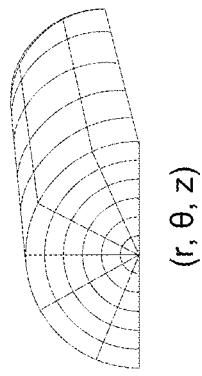
Figure 12A:
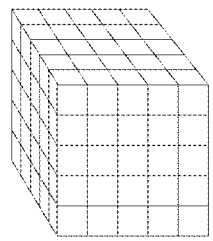

FIGS. 12A-12C illustrate several ways to partition a field of view into a plurality of voxels. In FIG. 12A, the field of view is partitioned using Cartesian coordinates into a plurality of cubic elements. The dimensions are not necessarily treated equally, so in some implementations, the voxels are rectangular solids rather than cubes. FIG. 12B illustrates the use of cylindrical coordinates, creating voxels that are shell-like. FIG. 12C illustrates the use of spherical coordinates, creating shell-like elements that have varying width. In some implementations, partitioning the field of view into voxels uses more than one coordinate system, such as finer voxels in the center of the field of view and larger voxels in the perimeter of the field of view.

FIGS. 13A and 13B illustrate a hierarchical process for identifying filled voxels. FIG. 13A has coarse voxels that are fairly large, and the process can identify which coarse voxels are filled with a relatively small lookup table. In this example, one voxel 1302 is filled. Each of the coarse voxels are subdivided into fine voxels, as illustrated in FIG. 13B. Once the process identifies which coarse voxel is filled, the process uses a second fine lookup table with just the fine voxels in the identified coarse voxel 1302. In this example, the process identifies four filled fine voxels, including fine voxel 1304. In many cases, applying two small lookup tables sequentially requires fewer resources (e.g., memory and CPU cycles) than having a single large lookup table with fine voxels. The hierarchical process illustrated here can be extended to even more levels as appropriate.

Figure 14:
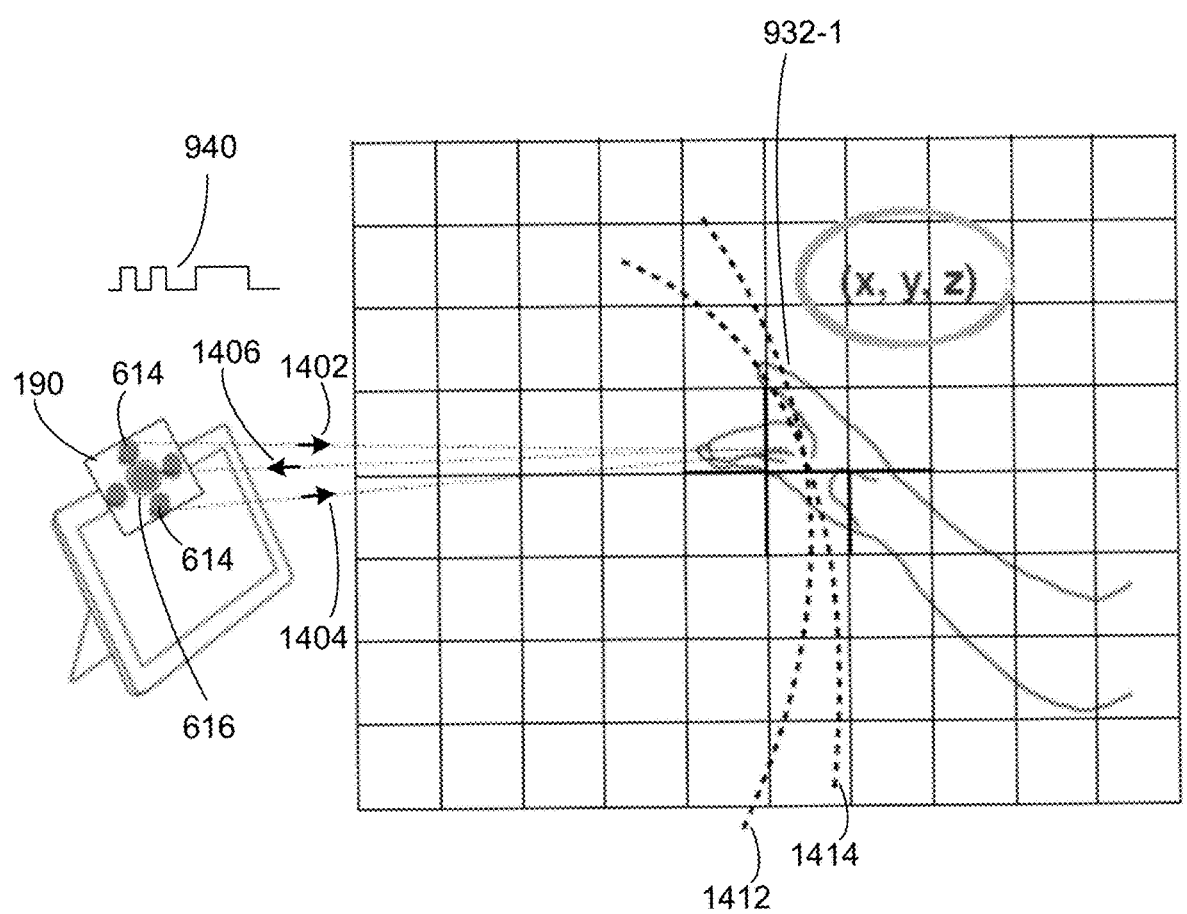
FIG. 14 illustrates a process of identifying an object in the field of view of an imaging device in accordance with some implementations.

FIG. 14 illustrates a process of identifying an object 932-1 in the field of view of an imaging device 190 in accordance with some implementations. In this example, the imaging device has a single signal detector 616 (e.g., a photodiode) and four signal emitters 614 (e.g., infrared LEDs). A modulation control signal 940 is first sent to one of the LEDs to generate a first signal 1402. A portion of the generated signal 1402 is reflected by the object 932-1 back to signal detector 616. The reflected signal is sampled at a plurality of points in time (e.g., at a fixed time interval), and saved as components of a response vector (see response vector Y in FIGS. 20-23). The modulation signal 940 (which may be the same or different from the modulation signal used for the first signal emitter) is then applied to a second signal emitter to generate a second signal 1404. As with the first signal emitter, a portion of the generated signal 1404 is reflected by the object 932-1 and returned to the signal detector 616. This received signal is also sampled, and the sample measurements are added to the response vector. For each of the signal emitters 614, a modulation signal 940 drives the emitter to illuminate the field of view, and the object 932-1 creates a reflected signal 1406, which is captured by the signal detector 616. The detected signal is sampled multiple times to add components to the response vector.

Conceptually, each signal emitter/signal detector pair provides some information about the location of objects. For example, the first dotted line 1412 conceptually represents where an object might be based on the information from the first illumination signal 1402. The second dotted line 1414 conceptually represents where an object might be based on the information from the second illumination signal 1404. Using the data from both signal emitter/signal detector pairs (as well as two other pairs here), the process is able to identify the location of the object 932-1 with relatively high accuracy.

In some implementations, the process uses data for each (emitter, detector) pair. For example, the imaging device 190 in FIG. 14 has a single detector 616 and four emitters 614, so there are four (emitter, detector) pairs. Some implementations multiplex the emitters and/or the detectors, which creates a greater variety of options. For example, with 4 emitters, there are 15 ($=2^4-1$) possible non-empty subsets of emitters, so there are 15 possible ({emitters}, {detectors}) combinations. When multiplexing is used, some implementations choose to use less than all possible ({ emitters}, {detectors}) combinations.

Some implementations are able to attain high accuracy with low power based on several factors, including the use of waveform coding (the modulation signals) and algorithms that exploit sparsity. First, the techniques use light transport physics for physically accurate modeling of scene response. Second, some implementations use variable lifting. Instead of using three non-linear variables, implementations partition the scene into a large number of discrete linear variables (e.g., each voxel is either filled or empty). Depending on the size of the field of view and the size of the voxels, there can be thousands or millions of linear variables. Third, implementations generate pseudorandom waveform sampling for incoherent sampling of the search apace. This compressive sampling is able to get much more relevant information from a small number of samples. Fourth, implementations use sparse estimation algorithms to solve the convex optimization problem in real-time based on carefully designed lookup tables. These processes are described in more detail with respect to FIGS. 15-25 below.

The process of determining object location uses one or more lookup tables, as illustrated in FIGS. 15-19. As shown in FIG. 15, the field of view 1550 is partitioned into a plurality of voxels. Although the graphical depiction is two-dimensional, the field of view 1550 and the voxels 1500 are three-dimensional. The lookup table 652 has a plurality of columns 1502, each corresponding to one of the voxels 1500. Within each column 1502, there are sequences of entries that correspond to each of the (emitter, detector) pairs 1512 from the imaging device 190. In this example, there are four emitters and one detector, so there are four (emitter, detector) pairs 1512. Each of the sequences in a column for a single (emitter, detector) pair is a sequence of time samples from the respective detector based on reflected illumination from the respective emitter. In some implementation, each sequence of time samples has 10 elements. In some implementations, each sequence of time samples has 50 elements. As illustrated in FIGS. 15-18, the sequences of time samples for the first (emitter, detector) pair form a first row band 1514-1 in the lookup table 652. Because this example has four (emitter, detector) pairs, there are four row bands 1514-1, . . . , 1514-4.

The emitter illuminates the field of view according to a selected modulation signal 940, and the detector receives the reflected illumination 950. Each sequence within a column of the lookup table comprises samples of the reflected signal 950 taken at points in time (e.g., every microsecond, every ten microseconds, or every 100 microseconds). Typically, the same sampling frequency is used for all of the voxels and for all of the (emitter, detector) pairs, so each of the sequences has the same number of samples (e.g., 10 samples, 50 samples, or 100 samples).

In some implementations, the lookup table is constructed based on actual physical experiments. In each experiment, a single voxel is filled, and the remaining voxels are empty. In some implementations, the lookup table is constructed based on computer simulation using the known information about the signal emitters 614, the signal detectors 616, the orientation of the signal emitters and detectors, and the modulation signal 940.

In FIG. 15, a first voxel 1500-1 is filled, and is illuminated by the signal emitter in a first (emitter, detector) pair 1512-1. Either based on an actual experiment, or by computer simulation, a response signal 950 is detected by the signal detector in the first (emitter, detector) pair. The response signal is sampled to form a sequence of sampled values 1516(1,1) for the first (emitter, detector) pair.

Figure 16:
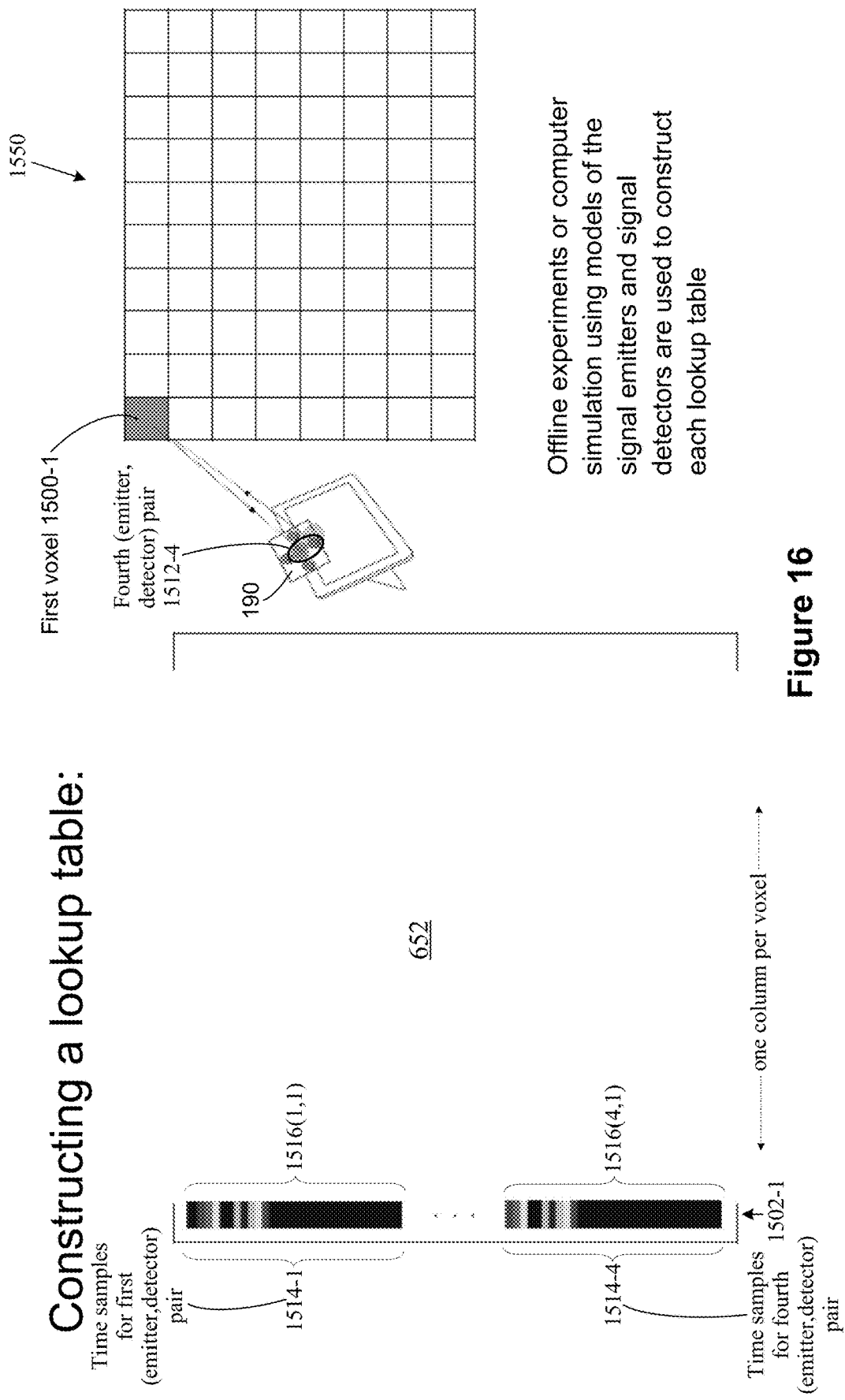

For the first voxel 1500-1, the same process is repeated for each of the (emitter, detector) pairs to fill out the first column 1502-1 of the lookup table 652. FIG. 16 illustrates the process with the fourth (emitter, detector) pair 1512-4 for the first voxel 1500-1. The received response signal is sampled to create a time sequence of samples 1516(4,1) for the fourth (emitter, detector) pair. As shown in FIG. 16, this time sequence of samples 1516(4,1) is the first column of the fourth row band 1514-4.

FIG. 17 illustrates the same process applied to the second voxel 1500-2 in the field of view 1550. The second voxel 1500-2 corresponds to the second column 1502-2 of the lookup table 652. Prior to the image shown in FIG. 17, the first three (emitter, detector) pairs have already been processed, filling in the second column for the first three row bands. In particular, the time samples 1516(1,2) have already been determined for the first (emitter, detector) pair 1512-1 for the second voxel 1500-2. FIG. 17 illustrates filling in the time samples 1516(4,2) for the fourth (emitter, detector) pair for the second voxel.

Figure 18:
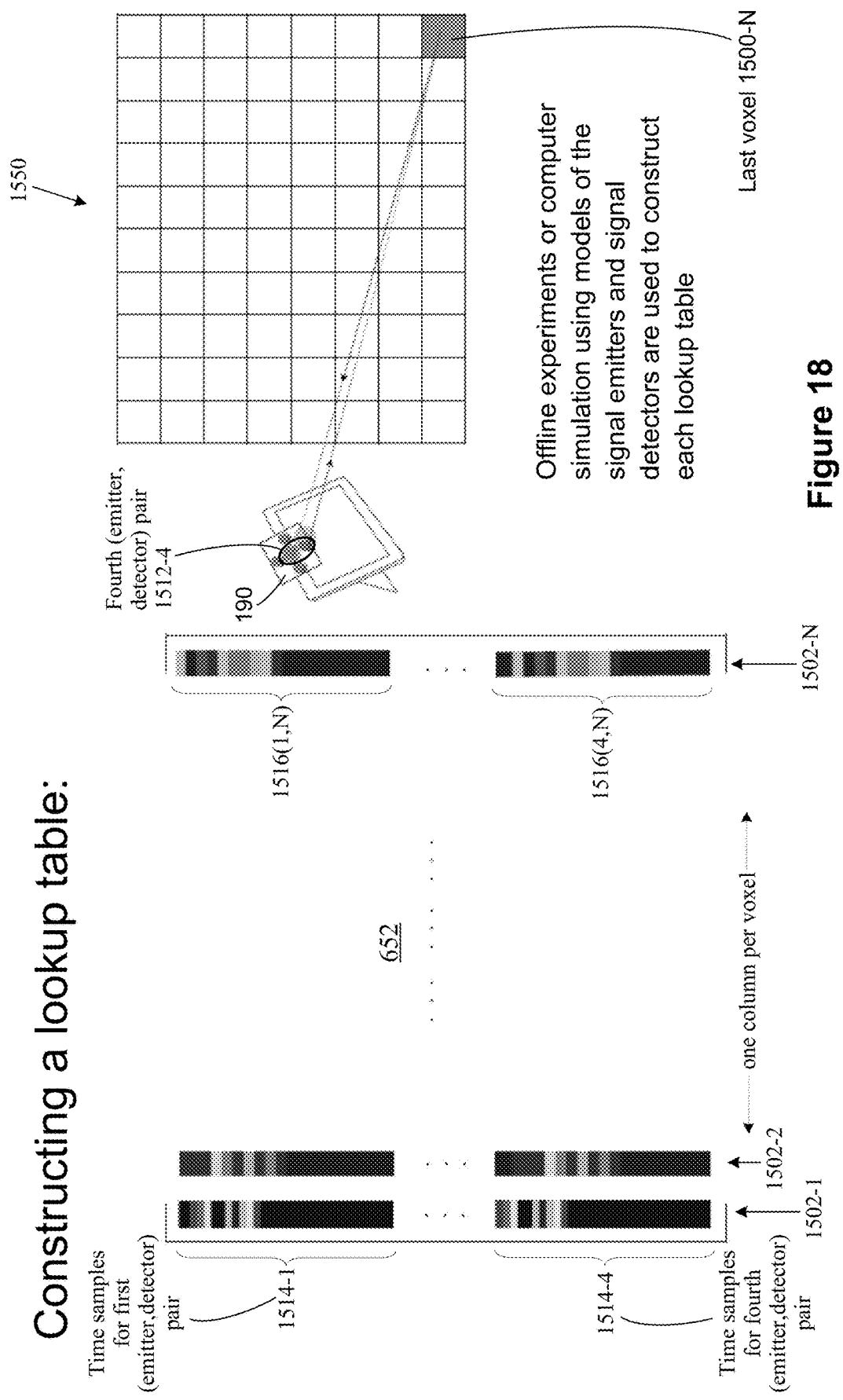

FIG. 18 illustrates constructing the last column 1502-N of the lookup table corresponding to the last voxel 1500-N in the field of view. Just like the other voxels, there are four sequences of time samples 1516(1,N), . . . , 1516(4,N) corresponding to the four (emitter, detector) pairs 1512-1, . . . , 1512-4.

FIG. 19 illustrates the same lookup table 652 as in FIG. 18, but showing the individual entries in the lookup table rather than grouping the rows into four bands 1514-1, . . . , 1514-4. The lookup table 652 has M rows, where M=4×[the number of samples from each response signal].

FIGS. 20-23 illustrate a process for identifying objects in the field of view of an imaging device using the lookup table 652. The vector X 2004 has a component entry for each of the voxels in the field of view. In this example, X is written as a column vector. In some implementations, each entry is 0 or 1, depending on whether the voxel is filled. In some implementations, the values are in the range $0 \le x_i \le 1$ for each component $x_i$, where $x_i$ is a probability that the corresponding voxel is filled. The sample vector Y 2002 corresponds to the time-sampling of each response signal corresponding to each of the (emitter, detector) pairs, formed in the same way as the lookup table A 652. That is, the arrangement of the elements in the sample vector Y 2002 corresponds to the selected modulation signal, the ordering of the (emitter, detector) pairs, and the sampling frequency of the response signals. By making the assumption that the reflected signals are essentially additive, the formulas Y=AX holds. In other words, the total response signal is the superposition of the individual response signals created by individual voxels.

Of course it would be more useful to express X as a function of A and Y. If the lookup table A were invertible, then $X=A^{-1}Y$, and simple calculations identify which voxels are filled. Because this is not generally feasible, implementations use the formula illustrated in FIG. 23. The goal is to minimize the difference between Y and AX. The first portion 2310 of the formula computes the $l_2$ norm of the difference between Y and AX, which is standard Euclidian distance in $R^M$. In some implementations, a second portion 2320 is added, which is just a constant λ times the $l_1$ norm of the vector X (the sum of the absolute sizes of the components). In this case, if each of the components is 0 or 1, then the $l_1$ norm of X is just the total number of non-zero components. This second term creates a preference for selecting vectors with the least number of non-zero components. The function arg $\min_x$ ( ) indicates that the vector X is selected to minimize the value of the expression. Based on the measured samples, this is the estimate of the filled voxels that comes closest to matching what was actually observed.

Subsequent processes can enhance this basic technique in various ways, such as performing the lookup as a multi-step hierarchical process or doing heuristic analysis of the estimated filled voxels (e.g., clustering together filled voxels that are physically close in the field of view). In addition to locating the position of an object, sequential processing can be used to determine object movement and gestures. In addition, once the filled voxels are known, some implementations construct a depth map of the field of view, which identifies, for each pixel in a two-dimensional view, the depth of the closest object.

Figure 24:
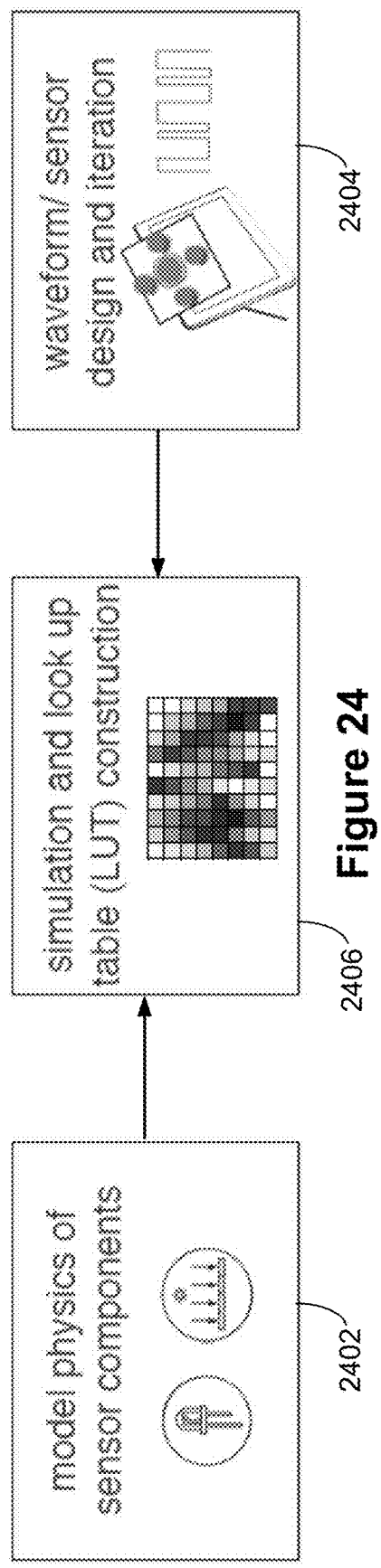
FIG. 24 provides a concise summary for building a lookup table in accordance with some implementations.

FIG. 24 provides a concise summary of one implementation for building a lookup table. Since a lookup table depends on the number and configuration of the signal emitters and signal detectors, a separate lookup table is created for each configuration. However, once the lookup table is created, it can be used an unlimited number of times (e.g., for millions or billions of imaging devices having the same configuration). In a simulation approach, the process models (2402) the physics of the sensor components (e.g., LEDs and photodiodes). In addition, the process determines (2404) an appropriate modulation waveform 940 and an appropriate sensor configuration (e.g., how many emitters, how many detectors, and where they are placed). Some implementations use an iterative process. Based on the physics of the components, the configuration of the components, and the selected modulation signal, the process uses computer simulation to construct the lookup table 652.

Although the same lookup table may be used for many distinct instances of an image device that have the same configuration, sometimes flaws or discrepancies are introduced in the manufacturing process of individual emitters, individual detectors, or the placement of these elements within an imaging device. Some implementations address this issue by performing a calibration process on each manufactured imaging device. In some implementations, the lookup table 652 is adjusted to account for the flaws or discrepancies. In some implementations, the flaws and/or discrepancies are addressed by building a supplemental calibration table, which is used in the process (e.g., creating non-zero adjustment entries as needed).

Figure 25:
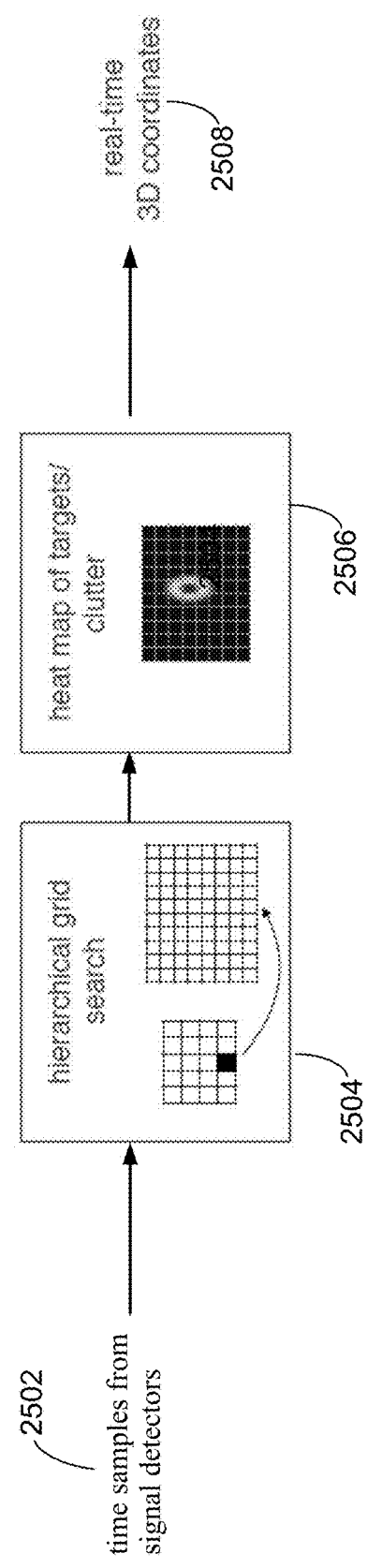
FIG. 25 illustrates using a lookup table to determine the real-time 3D coordinates of objects in the field of view, in accordance with some implementations.

FIG. 25 illustrates using the lookup table (or a hierarchy of lookup tables) to determine the real-time 3D coordinates of objects in the field of view. As illustrated in FIGS. 20-23, the modulation signal is applied to each of the (emitter, detector) pairs to determine response signals. These response signals are sampled to create time samples 2502. In some implementations, the time samples are used to perform (2504) a hierarchical search of the voxels in the field of view. In some implementations, when the process is hierarchical, the sampling rate for the coarse voxels is different from the sampling rate of the fine voxels. In some implementations, the process creates (2506) a heatmap of potential objects in the field of view, which provides the real-time 3D coordinates 2508 of the objects.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart media environments" may refer to smart environments for homes such as a single-family house, but the scope of the present teachings is not so limited. The present teachings are also applicable to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for analyzing a field of view, comprising:
at an electronic system having one or more processors and memory storing one or more programs configured for execution by the one or more processors:
illuminating the field of view by signals from one or more signal emitters according to a modulation signal;
at each of one or more signal detectors, obtaining one or more response signals from the field of view;
sampling the one or more response signals to form a response vector;
obtaining a lookup table corresponding to the modulation signal, wherein the field of view is partitioned into a plurality of voxels, and the lookup table includes information that specifies expected signals received by the one or more signal detectors when the voxel is filled and the signal emitters illuminate the field of view according to the modulation signal; and
comparing the response vector to the lookup table to determine which voxels are filled.

2. The method of claim 1, wherein comparing the response vector to the lookup table comprises computing a probability vector with a plurality of components, and wherein each component of the probability vector specifies a probability value that a corresponding voxel is filled.

3. The method of claim 2, further comprising:
in accordance with the plurality of probability values in the probability vector, identifying an object that occupies a region of interest in the field of view, wherein the region of interest includes a subset of the plurality of voxels whose corresponding probability values are greater than a predetermined threshold value.

4. The method of claim 1, further comprising:
in accordance with the plurality of probability values in the probability vector, identifying an object that occupies a region of interest in the field of view, wherein the region of interest includes a first subset of the plurality of voxels whose corresponding probability values are substantially greater than probability values corresponding to a second subset of voxels surrounding the first subset of voxels.

5. The method of claim 1, further comprising:
in accordance with the determined filled voxels, tracking movement of an object in the field of view during a sequence of two or more sampling times, including, at each sampling time, identifying the object at a distinct location associated with a distinct subset of the plurality of voxels.

6. The method of claim 5, wherein the tracked movement of the object includes a user gesture by a user located in the field of view.

7. The method of claim 5, further comprising generating an alert command in accordance with the tracked movement of the object.

8. The method of claim 7, wherein the electronic system includes a smoke detector, the tracked movement is a hand wave towards the smoke detector, and the alert command toggles an alarm signal from the smoke detector.

9. An electronic system for analyzing a field of view, comprising:
one or more processors; and
memory storing one or more programs for execution by the one or more processors, the one or more programs comprising instructions for:
illuminating the field of view by signals from one or more signal emitters according to a modulation signal;
at each of one or more signal detectors, obtaining one or more response signals from the field of view;
sampling the one or more response signals to form a response vector;
obtaining a lookup table corresponding to the modulation signal, wherein the field of view is partitioned into a plurality of voxels, and the lookup table includes information that specifies expected signals received by the one or more signal detectors when the voxel is filled and the signal emitters illuminate the field of view according to the modulation signal; and
comparing the response vector to the lookup table to determine which voxels are filled.

10. The electronic system of claim 9, wherein the modulation signal includes a pulse having a predetermined pulse width.

11. The electronic system of claim 9, wherein the modulation signal includes a digital signal corresponding to a bit stream containing a sequence of zeros and ones.

12. The electronic system of claim 9, wherein the modulation signal includes a digital clock signal having a variable frequency.

13. The electronic system of claim 9, wherein the modulation signal includes a chirp signal whose frequency increases or decreases with time within a frequency range.

14. The electronic system of claim 9, further comprising generating a two-dimensional depth map according to the plurality of probability values in the probability vector.

15. A non-transitory computer readable storage medium storing one or more programs configured for execution by one or more processors of an electronic system, the one or more programs comprising instructions for:
illuminating a field of view by signals from one or more signal emitters according to a modulation signal;
at each of one or more signal detectors, obtaining one or more response signals from the field of view;
sampling the one or more response signals to form a response vector;
obtaining a lookup table corresponding to the modulation signal, wherein the field of view is partitioned into a plurality of voxels, and the lookup table includes information that specifies expected signals received by the one or more signal detectors when the voxel is filled and the signal emitters illuminate the field of view according to the modulation signal; and
comparing the response vector to the lookup table to determine which voxels are filled.

16. The computer readable storage medium of claim 15, wherein for each column of the lookup table:
samples of unit response signals are arranged in series in the column;
each unit response signal is sensed by a subset of the one or more signal detectors; and
for each unit response signal, a subset of the one or more signal emitters are synchronized to illuminate the field of view according to a corresponding illumination pattern, thereby producing the unit response signal sensed at the subset of the one or more signal detectors.

17. The computer readable storage medium of claim 15, wherein comparing the response vector to the lookup table comprises determining a voxel vector X that minimizes $\|Y-AX\|_2$ wherein Y is the response vector, A is the lookup table, and X is a vector whose component values are zero or one depending on whether a corresponding voxel is filled.

18. The computer readable storage medium of claim 15, wherein the lookup table further corresponds to a plurality of device characteristics including characteristics of the one or more signal emitters, characteristics of the one or more signal detectors, and characteristics of one or more lenses and diffusers that modulate illumination by the one or more signal emitters.

19. The computer readable storage medium of claim 15, wherein the one or more programs further comprise instructions for:
- prior to comparing the response vector to the lookup table, calibrating a baseline of the response vector to remove background noise existing in the response signal.

20. The computer readable storage medium of claim 15, wherein each voxel is a coarse voxel that is further partitioned into a plurality of fine voxels, and the one or more programs further comprise instructions for:
- obtaining a fine lookup table corresponding to the modulation signal, and the fine lookup table includes information that specifies, for each fine voxel, expected signals received by the signal detectors when the fine voxel is filled and the signal emitters illuminate the field of view according to the modulation signal; and
- comparing the response vector to the fine lookup table to compute a fine probability vector including a plurality of fine probability values, wherein each fine probability value specifies a probability that a corresponding fine voxel is filled.

* * * * *